United States Patent
Kumar

(10) Patent No.: US 6,591,758 B2
(45) Date of Patent: Jul. 15, 2003

(54) HYBRID ENERGY LOCOMOTIVE ELECTRICAL POWER STORAGE SYSTEM

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/033,347

(22) Filed: Dec. 26, 2001

(65) Prior Publication Data

US 2002/0174798 A1 Nov. 28, 2002

Related U.S. Application Data

(60) Provisional application No. 60/278,975, filed on Mar. 27, 2001.

(51) Int. Cl.$^7$ ................................................. B61C 3/00
(52) U.S. Cl. .............................. 105/35; 105/50; 105/61; 180/65.3
(58) Field of Search ................................. 104/289, 288, 104/287; 105/35, 26.05, 49, 50, 61; 320/125, 126, 137, 140, 166, 167; 180/65.3, 65.4

(56) References Cited

U.S. PATENT DOCUMENTS

| | | | |
|---|---|---|---|
| 423,421 A | | 3/1890 | Farrall |
| 714,157 A | * 11/1902 | Davis .......................... 104/289 |
| 714,196 A | * 11/1902 | Kubierschky ................ 104/289 |
| 723,727 A | | 3/1903 | Pfeil |
| 744,187 A | * 11/1903 | Gibbs ........................... 105/35 |
| 807,029 A | * 12/1905 | Hoadley ....................... 105/35 |
| 881,387 A | *  3/1908 | Eastwood ..................... 105/49 |
| 1,188,570 A | *  6/1916 | Strobel ......................... 105/36 |
| 1,216,694 A | *  2/1917 | Jenkins ....................... 104/289 |
| 2,600,320 A | | 6/1952 | Potter |
| 2,704,813 A | | 3/1955 | Stamm |
| 3,238,896 A | | 3/1966 | Minenko et al. |

(List continued on next page.)

FOREIGN PATENT DOCUMENTS

JP          57-144157          9/1982

OTHER PUBLICATIONS

Railway Technical Web Pages, "Electric Traction Power Supply", copyright 1999, 2000, available at http://www.trainweb.org/railwaytechnical/etracp.html.

Railway Technical Web Pages, "Electrical Auxiliary Equipment Page", copyright Piers R. Connor 1998, 1999, 2000, available at http:/www.trainweb.org/railwaytechnical/elec-aux.html.

Railway Technical Web Pages, "Diesel Locomotive Technology", copyright 2000, 2001, available at http:/www.trainweb.org/railwaytechnical/diesel.html.

(List continued on next page.)

*Primary Examiner*—Mark T. Le
(74) *Attorney, Agent, or Firm*—Senniger, Powers, Leavitt & Roedel; Carl Rowald

(57) ABSTRACT

A hybrid energy locomotive system having an energy storage and regeneration system. In one form, the system can be retrofitted into existing locomotives, or installed as original equipment. The energy storage and regeneration system captures dynamic braking energy, excess motor energy, and externally supplied energy and stores the captured energy in one or more energy storage subsystems, including a flywheel, a battery, an ultra-capacitor, or a combination of such subsystems. The energy storage and regeneration system can be located in a separate energy tender vehicle. The separate energy tender vehicle is optionally equipped with traction motors. An energy management system is responsive to power storage and power transfer parameters, including data indicative of present and future track profile information, to determine present and future electrical energy storage and supply requirements. The energy management system controls the storage and regeneration of energy accordingly.

32 Claims, 25 Drawing Sheets

U.S. PATENT DOCUMENTS

| | | |
|---|---|---|
| 3,455,107 A | 7/1969 | Dixon et al. |
| 3,743,901 A | 7/1973 | Johnson |
| 3,858,674 A | 1/1975 | Tabor |
| 3,886,810 A | 6/1975 | Sugiyama et al. |
| 3,972,380 A | 8/1976 | Hudson et al. |
| 4,108,077 A | 8/1978 | Laing |
| 4,165,795 A * | 8/1979 | Lynch et al. ............... 180/65.2 |
| 4,342,921 A | 8/1982 | Williams |
| 4,382,189 A | 5/1983 | Wilson |
| 4,900,944 A | 2/1990 | Donnelly |
| 5,215,156 A | 6/1993 | Stulbach et al. |
| 5,291,960 A | 3/1994 | Brandenburg et al. |
| 5,345,761 A | 9/1994 | King et al. |
| 5,392,716 A | 2/1995 | Orschek et al. |
| 5,517,093 A | 5/1996 | Augustyniak et al. |
| 5,517,923 A * | 5/1996 | Cathiard ..................... 104/289 |
| 5,713,425 A | 2/1998 | Buschhaus et al. |
| 5,771,743 A | 6/1998 | Menzi |
| 5,839,533 A | 11/1998 | Mikami et al. |
| 5,929,595 A | 7/1999 | Lyons et al. |
| 5,999,864 A * | 12/1999 | Thiel et al. ................... 701/22 |
| 6,022,290 A | 2/2000 | Lyon |
| 6,026,921 A | 2/2000 | Aoyama et al. |
| 6,144,901 A | 11/2000 | Nickles et al. |
| 6,307,277 B1 | 10/2001 | Tamai et al. |
| 6,308,639 B1 | 10/2001 | Donnelly et al. |
| 6,314,346 B1 * | 11/2001 | Kitajima et al. ........... 180/65.1 |
| 6,367,570 B1 * | 4/2002 | Long et al. ................. 180/65.2 |
| 6,387,007 B1 * | 5/2002 | Fini, Jr. ..................... 180/65.4 |
| 6,408,766 B1 | 6/2002 | McLaughlin et al. |
| 6,441,581 B1 | 8/2002 | King et al. |
| 6,497,182 B2 | 12/2002 | Melpolder et al. |

OTHER PUBLICATIONS

Railway Technical Web Pages, "Direct Current Traction Motor Systems", copyright Piers R. Connor 1999, 2000, available at http:/www.trainweb.org/railwaytechnical/tract–01.html.

Presentation—Maxwell Technologies™—"Transportation Applications *PowerCache*™ *Ultracapactiors*"—Dated Jan. 2001.

Presentation—Richard E. Smith, "The Joule of Power Electronics: Ultracapacitors In The Design of Power Systems"—Dated Jun. 29, 2000—available at www.powercache.com.

* cited by examiner

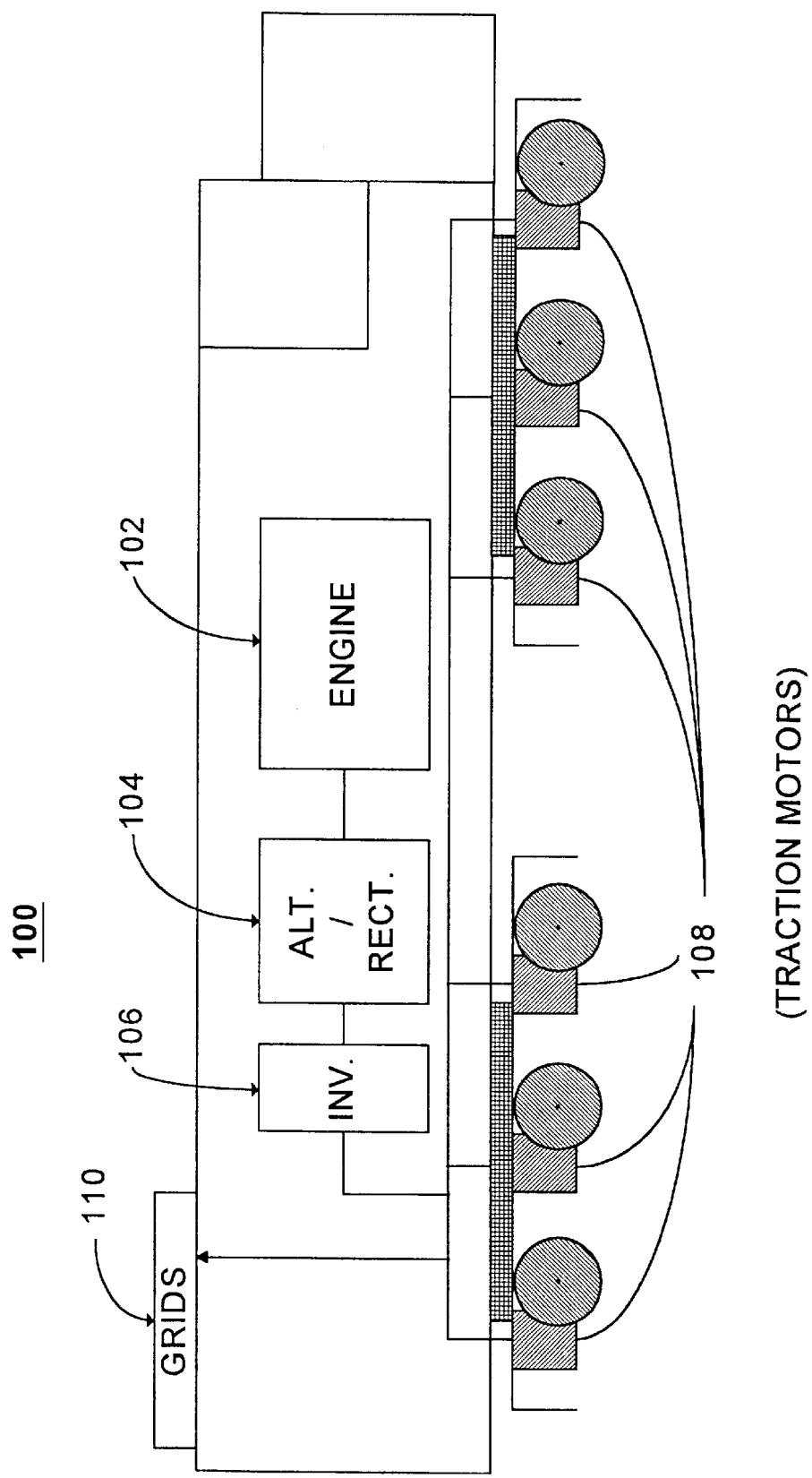

FIG. 7A power
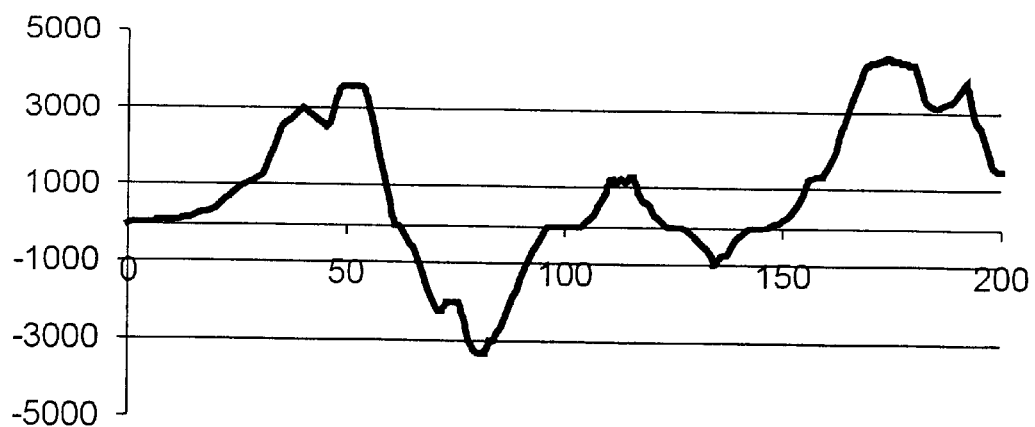
FIG. 7B storage power possible
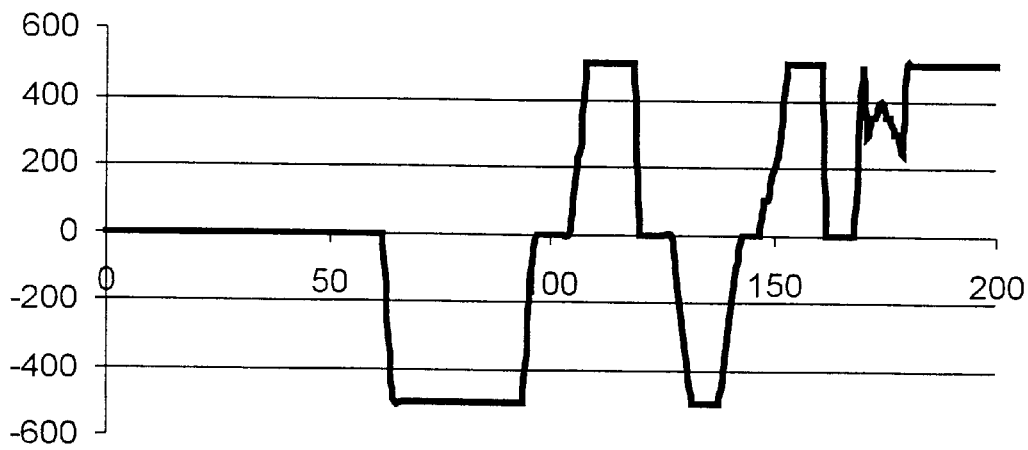

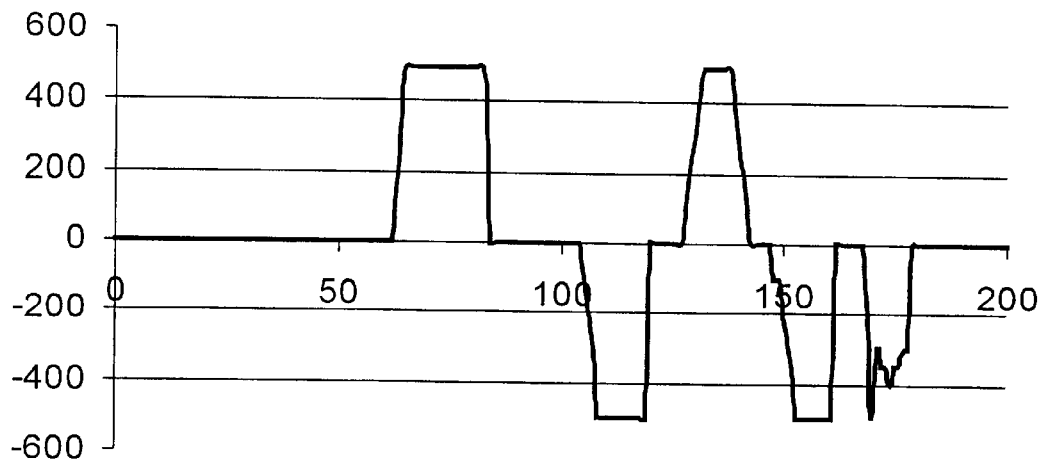
FIG. 7C  charge power
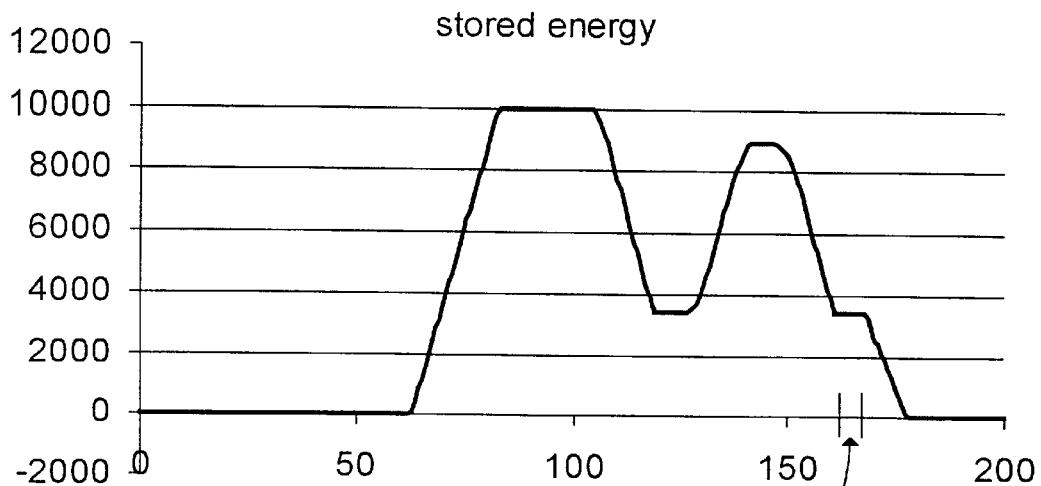
FIG. 7D  stored energy
Energy Management System Prevents Complete Discharge In View Of Anticipated Demand FIG. 8A  power
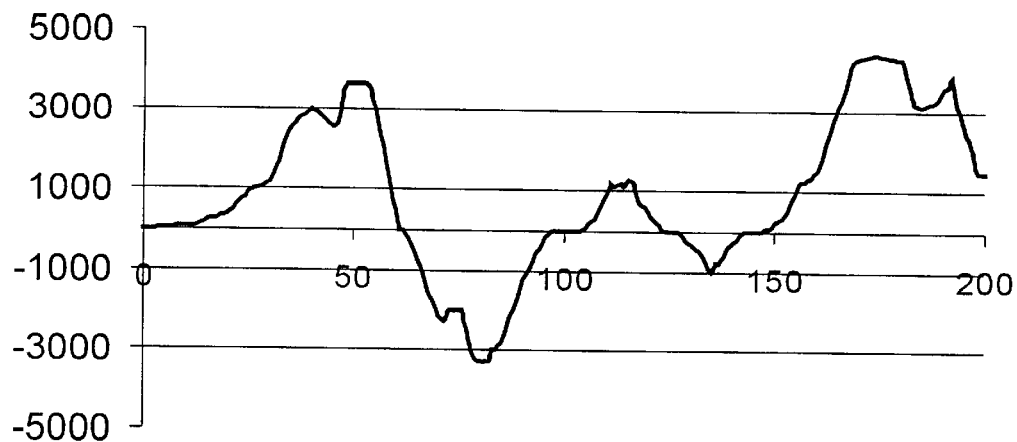
FIG. 8B  storage power possible
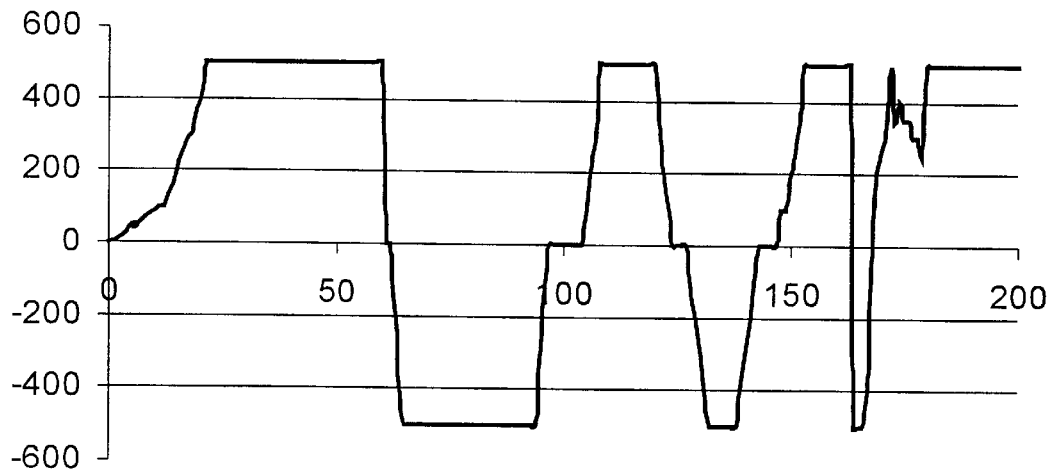

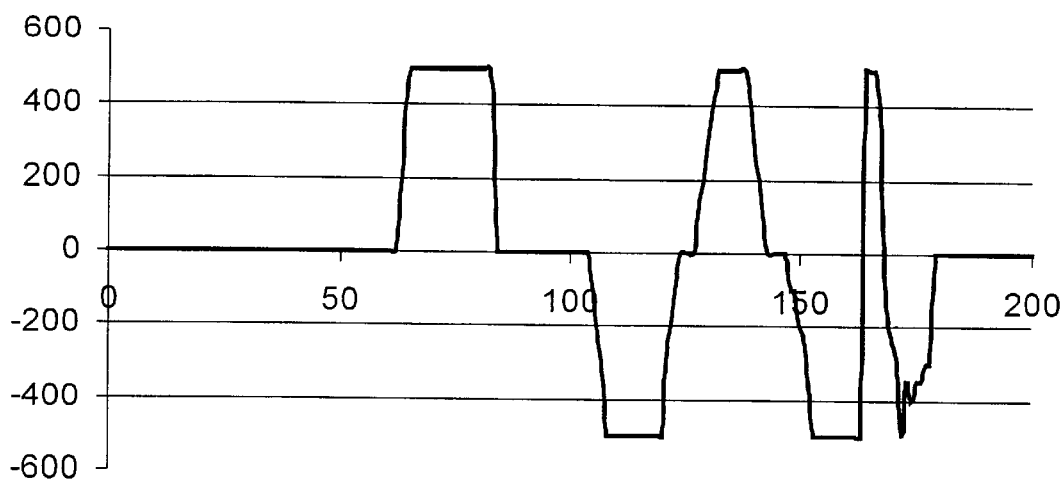
FIG. 8C   charge power
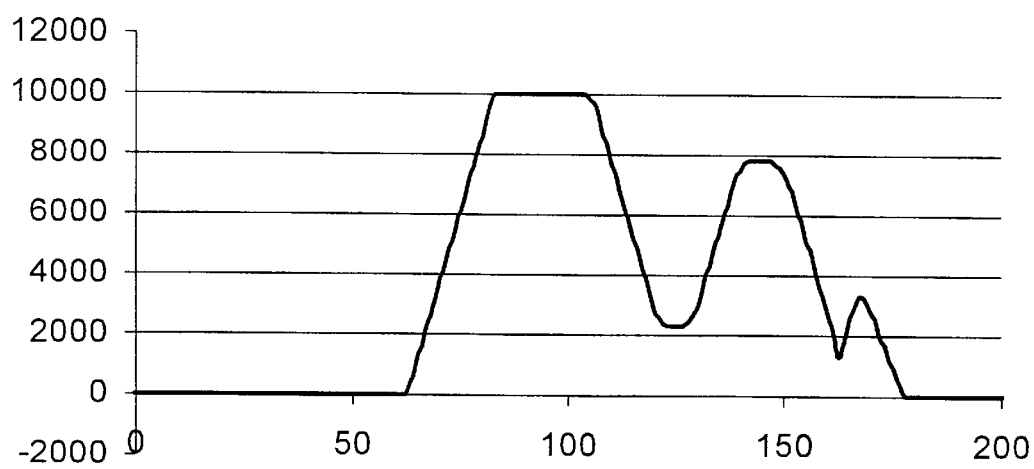
FIG. 8D   stored energy

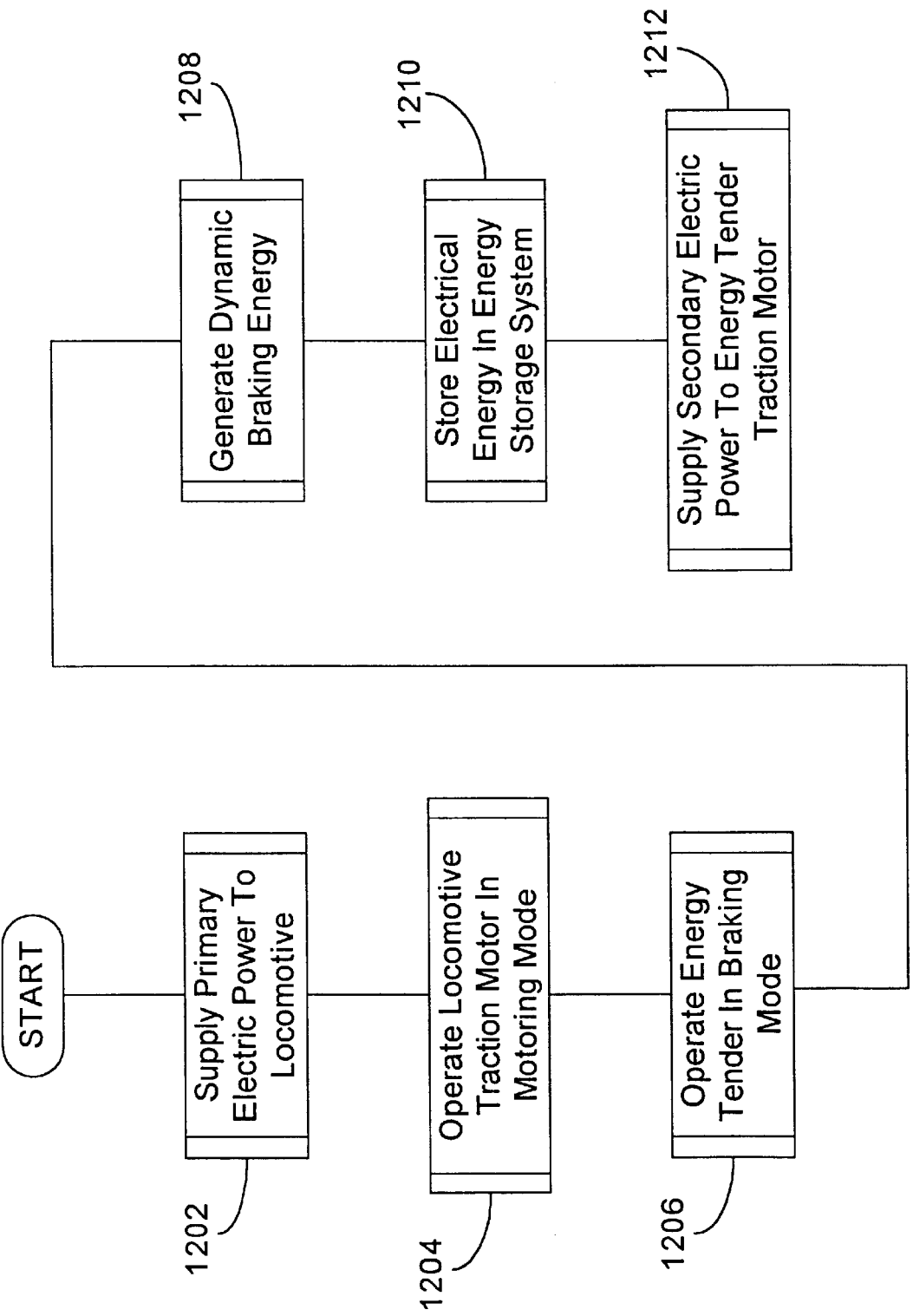

HYBRID ENERGY LOCOMOTIVE ELECTRICAL POWER STORAGE SYSTEM

CROSS REFERENCE TO RELATED APPLICATIONS

The invention of the present application claims priority based on U.S. Provisional Application Ser. No. 60/278,975, filed on Mar. 27, 2001, the entire disclosure of which is incorporated herein by reference.

The following commonly owned, co-pending applications are related to the present application and are incorporated herein by reference:

U.S. patent application Ser. No. 10/033,172, filed on Dec. 26, 2001, and entitled "HYBRID ENERGY POWER MANAGEMENT SYSTEM AND METHOD";

U.S. patent application Ser. No. 10/033,191, filed on Dec. 26, 2001, and entitled "HYBRID ENERGY LOCOMOTIVE SYSTEM AND METHOD"; and U.S. patent application Ser. No. 10/032,7 14, filed on Dec. 26, 2001, and entitled "LOCOMOTIVE ENERGY TENDER".

FIELD OF THE INVENTION

The invention relates generally to hybrid energy systems and methods for use in connection with large, off-highway vehicles such as locomotives. In particular, the invention relates to a system and method for selectively capturing, storing, and regenerating electrical energy, such as dynamic braking energy, produced by locomotives driven by electric traction motors.

BACKGROUND OF THE INVENTION

FIG. 1A is a block diagram of an exemplary prior art locomotive 100. In particular, FIG. 1A generally reflects a typical prior art diesel-electric locomotive such as, for example, the AC6000 or the AC4400, both or which are available from General Electric Transportation Systems. As illustrated in FIG. 1A, the locomotive 100 includes a diesel engine 102 driving an alternator/rectifier 104. As is generally understood in the art, the alternator/rectifier 104 provides DC electric power to an inverter 106 which converts the AC electric power to a form suitable for use by a traction motor 108 mounted on a truck below the main engine housing. One common locomotive configuration includes one inverter/traction motor pair per axle. Such a configuration results in three inverters per truck, and six inverters and traction motors per locomotive. FIG. 1A illustrates a single inverter 106 for convenience.

Strictly speaking, an inverter converts DC power to AC power. A rectifier converts AC power to DC power. The term converter is also sometimes used to refer to inverters and rectifiers. The electrical power supplied in this manner may be referred to as prime mover power (or primary electric power) and the alternator/rectifier 104 may be referred to as a source of prime mover power. In a typical AC diesel-electric locomotive application, the AC electric power from the alternator is first rectified (converted to DC). The rectified AC is thereafter inverted (e.g., using power electronics such as IGBTs or thyristors operating as pulse width modulators) to provide a suitable form of AC power for the respective traction motor 108.

As is understood in the art, traction motors 108 provide the tractive power to move locomotive 100 and any other vehicles, such as load vehicles, attached to locomotive 100. Such traction motors 108 may be AC or DC electric motors. When using DC traction motors, the output of the alternator is typically rectified to provide appropriate DC power. When using AC traction motors, the alternator output is typically rectified to DC and thereafter inverted to three-phase AC before being supplied to traction motors 108.

The traction motors 108 also provide a braking force for controlling speed or for slowing locomotive 100. This is commonly referred to as dynamic braking, and is generally understood in the art. Simply stated, when a traction motor is not needed to provide motivating force, it can be reconfigured (via power switching devices) so that the motor operates as a generator. So configured, the traction motor generates electric energy which has the effect of slowing the locomotive. In prior art locomotives, such as the locomotive illustrated in FIG. 1A, the energy generated in the dynamic braking mode is typically transferred to resistance grids 110 mounted on the locomotive housing. Thus, the dynamic braking energy is converted to heat and dissipated from the system. In other words, electric energy generated in the dynamic braking mode is typically wasted.

It should be noted that, in a typical prior art DC locomotive, the dynamic braking grids are connected to the traction motors. In a typical prior art AC locomotive, however, the dynamic braking grids are connected to the DC traction bus because each traction motor is normally connected to the bus by way of an associated inverter (see FIG. 1B). FIG. 1A generally illustrates an AC locomotive with a plurality of traction motors; a single inverter is depicted for convenience.

FIG. 1B is an electrical schematic of a typical prior art AC locomotive. It is generally known in the art to employ at least two power supply systems in such locomotives. A first system comprises the prime mover power system that provides power to the traction motors. A second system provides power for so-called auxiliary electrical systems (or simply auxiliaries). In FIG. 1B, the diesel engine (see FIG. 1A) drives the prime mover power source 104 (e.g., an alternator and rectifier), as well as any auxiliary alternators (not illustrated) used to power various auxiliary electrical subsystems such as, for example, lighting, air conditioning/heating, blower drives, radiator fan drives, control battery chargers, field exciters, and the like. The auxiliary power system may also receive power from a separate axle driven generator. Auxiliary power may also be derived from the traction alternator of prime mover power source 104.

The output of prime mover power source 104 is connected to a DC bus 122 which supplies DC power to the traction motor subsystems 124A–124F. The DC bus 122 may also be referred to as a traction bus because it carries the power used by the traction motor subsystems. As explained above, a typical prior art diesel-electric locomotive includes four or six traction motors. In FIG. 1B, each traction motor subsystem comprises an inverter (e.g., inverter 106A) and a corresponding traction motor (e.g., traction motor 108A).

During braking, the power generated by the traction motors is dissipated through a dynamic braking grid subsystem 110. As illustrated in FIG. 1A, a typical prior art dynamic braking grid includes a plurality of contactors (e.g., DB1–DB5) for switching a plurality of power resistive elements between the positive and negative rails of the DC bus 122. Each vertical grouping of resistors may be referred to as a string. One or more power grid cooling blowers (e.g., BL1 and BL2) are normally used to remove heat generated in a string due to dynamic braking.

As indicated above, prior art locomotives typically waste the energy generated from dynamic braking. Attempts to make productive use of such energy have been unsatisfactory. For example, systems that attempt to recover the heat energy for later use to drive steam turbines require the ability to heat and store large amounts of water. Such systems are not suited for recovering energy to propel the locomotive itself. Another system attempts to use energy generated by a traction motor in connection with an electrolysis cell to generate hydrogen gas for use as a supplemental fuel source. Among the disadvantages of such a system are the safe storage of the hydrogen gas and the need to carry water for the electrolysis process. Still other prior art systems fail to recapture the dynamic braking energy at all, but rather selectively engage a special generator that operates when the associated vehicle travels downhill. One of the reasons such a system is unsatisfactory is because it fails to recapture existing braking energy.

Therefore, there is a need for an improved system that captures and stores the electric energy, such as the energy generated in the dynamic braking mode, and that supplies the stored energy for later use.

SUMMARY OF THE INVENTION

In one aspect, the invention relates to a hybrid energy locomotive system for use in connection with a train. The hybrid energy locomotive system comprises a locomotive having a plurality of locomotive wheels. A locomotive traction motor is associated with one of the plurality of locomotive wheels. The locomotive traction motor has a first rotatable shaft mechanically coupled to the one of the plurality of locomotive wheels. An electric power source selectively supplies locomotive electric power to the locomotive traction motor. The locomotive traction motor is operable in response to the locomotive electric power to rotate the first rotatable shaft and to drive the one of the plurality of locomotive wheels. The locomotive traction motor further has a dynamic braking mode of operation in which the locomotive traction motor generates electrical energy in the form of electricity. An electrical energy capture system is in electrical communication with the locomotive traction motor. The electrical energy capture system selectively stores electrical energy generated in the dynamic braking mode and selectively provide secondary electric power from the stored electrical energy. The electrical energy capture system selectively supplements the locomotive electric power with the secondary electric power.

In another aspect, the invention relates to a hybrid energy locomotive system for propelling a consist on a track. The system comprises an engine. A power converter is driven by the engine and provides primary electric power. A traction bus is coupled to the power converter and carries the primary electric power. A locomotive traction system is coupled to the traction bus. The locomotive traction system has a motoring mode and a dynamic braking mode. The locomotive traction system propels the consist in response to the primary electric power in the motoring mode. The locomotive traction system generates electricity in the dynamic braking mode. An energy storage selectively captures the electricity generated by the locomotive traction system in the dynamic braking mode and selectively transfers a first portion of the captured electricity to the locomotive traction system to augment the primary electric power in the motoring mode.

In yet another aspect, the invention relates to an electrical energy capture system for use in connection with a hybrid energy locomotive system. The hybrid energy locomotive system includes a locomotive. A locomotive power source supplies primary electric power. A locomotive traction motor propels the locomotive in response to the primary electric power. The locomotive traction motor has a dynamic braking mode of operation generating electricity. The electrical energy capture system comprises an electrical energy storage device in electrical communication with the locomotive traction motor. The electrical energy storage device selectively stores a portion of the electricity generated in the dynamic braking mode and selectively provides secondary electric energy from the stored electricity.

BRIEF DESCRIPTION OF THE DRAWINGS

FIG. 1A is a block diagram of a prior art diesel-electric locomotive.

FIGS. 7A–7D are timing diagrams that illustrate another embodiment energy management system for controlling the storage and regeneration of energy, including dynamic braking energy.

FIGS. 8A–8E are timing diagrams that illustrate another embodiment energy management system for controlling the storage and regeneration of energy, including dynamic braking energy.

FIG. 12 is a flow chart that illustrates one method of operating a hybrid energy locomotive system.

Corresponding reference characters and designations generally indicate corresponding parts throughout the drawings.

DETAILED DESCRIPTION OF PREFERRED EMBODIMENTS

Figure 2:
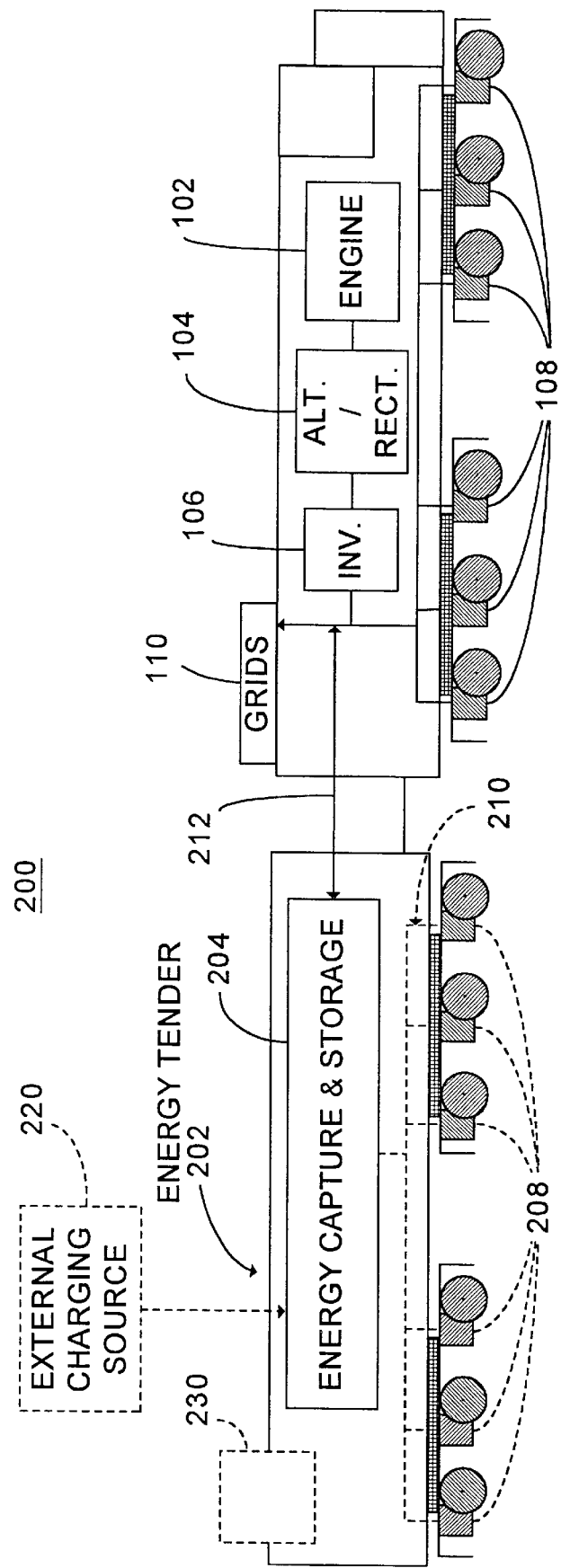
FIG. 2 is a block diagram of one embodiment of a hybrid energy locomotive system having a separate energy tender vehicle.

FIG. 2 is a block diagram of one embodiment of a hybrid energy locomotive system 200. In this embodiment, the hybrid energy locomotive system preferably includes an energy tender vehicle 202 for capturing and regenerating at least a portion of the dynamic braking electric energy generated when the locomotive traction motors operate in a dynamic braking mode. The energy tender vehicle 202 is constructed and arranged to be coupled to the locomotive in a consist configuration, and includes an energy capture and storage system 204 (sometimes referred to as an energy storage medium or an energy storage). It should be understood that it is common to use two or more locomotives in a consist configuration and that FIG. 2 illustrates a single locomotive for convenience.

In one embodiment, the energy capture and storage system 204 selectively receives electrical power generated during the dynamic braking mode of operation and stores it for later regeneration and use. In the alternative or in addition to receiving and storing dynamic braking power, energy capture and storage system 204 can also be constructed and arranged to receive and store power from other sources. For example, excess prime mover power from engine 102 can be transferred and stored. Similarly, when two or more locomotives are operating in a consist, excess power from one of the locomotives can be transferred and stored in energy capture and storage system 204. Also, a separate power generator (e.g., diesel generator) can be used to supply a charging voltage (e.g., a constant charging voltage) to energy capture and storage system. Still another source of charging is an optional off-train charging source 220. For example, energy capture and storage system 204 can be charged by external sources such as a battery charger in a train yard or at a wayside station.

The energy capture and storage system 204 preferably includes at least one of the following storage subsystems for storing the electrical energy generated during the dynamic braking mode: a battery subsystem, a flywheel subsystem, or an ultra-capacitor subsystem. Other storage subsystems are possible. Ultra-capacitors are available from Maxwell Technologies. These storage subsystems may be used separately or in combination. When used in combination, these storage subsystems can provide synergistic benefits not realized with the use of a single energy storage subsystem. A flywheel subsystem, for example, typically stores energy relatively fast but may be relatively limited in its total energy storage capacity. A battery subsystem, on the other hand, often stores energy relatively slowly but can be constructed to provide a relatively large total storage capacity. Hence, a flywheel subsystem may be combined with a battery subsystem wherein the flywheel subsystem captures the dynamic braking energy that cannot be timely captured by the battery subsystem. The energy thus stored in the flywheel subsystem may be thereafter used to charge the battery. Accordingly, the overall capture and storage capabilities are preferably extended beyond the limits of either a flywheel subsystem or a battery subsystem operating alone. Such synergies can be extended to combinations of other storage subsystems, such as a battery and ultra-capacitor in combination where the ultra-capacitor supplies the peak demand needs.

It should be noted at this point that, when a flywheel subsystem is used, a plurality of flywheels is preferably arranged to limit or eliminate the gyroscopic effect each flywheel might otherwise have on the locomotive and load vehicles. For example, the plurality of flywheels may be arranged on a six-axis basis to greatly reduce or eliminate gyroscopic effects. It should be understood, however, that reference herein to a flywheel embraces a single flywheel or a plurality of flywheels.

Referring still to FIG. 2, energy capture and storage system 204 not only captures and stores electric energy generated in the dynamic braking mode of the locomotive, it also supplies the stored energy to assist the locomotive effort (i.e., to supplement and/or replace prime mover power). For example, energy tender vehicle 202 optionally includes a plurality of energy tender traction motors 208 mounted on the trucks supporting energy tender vehicle 202. The electrical power stored in energy capture and storage 204 may be selectively supplied (e.g., via lines 210) to the energy tender traction motors 208. Thus, during times of increased demand, energy tender traction motors 208 augment the tractive power provided by locomotive traction motors 108. As another example, during times when it is not possible to store more energy from dynamic braking (e.g., energy storage system 204 is charged to capacity), efficiency considerations may suggest that energy tender traction motors 208 also augment locomotive traction motors 108.

It should be appreciated that when energy capture and storage system 204 drives energy tender traction motors 208, additional circuitry will likely be required. For example, if energy capture and storage system 204 comprises a battery storing and providing a DC voltage, one or more inverter drives may be used to convert the DC voltage to a form suitable for use by the energy tender traction motors 208. Such drives are preferably operationally similar to those associated with the main locomotive.

Rather than (or in addition to) using the electrical power stored in energy capture and storage 204 for powering separate energy tender traction motors 208, such stored energy may also be used to augment the electrical power supplied to locomotive traction motors 108 (e.g., via line 212).

Other configurations are also possible. For example, the locomotive itself may be constructed and arranged (e.g., either during manufacturing or as part of a retrofit program) to capture, store, and regenerate excess electrical energy, such as dynamic braking energy or excess motor power. In another embodiment, a locomotive may be replaced with an autonomous tender vehicle. In still another embodiment, similar to the embodiment illustrated in FIG. 2, the separate energy tender vehicle is used solely for energy capture, storage, and regeneration—the tender does not include the optional traction motors 208. In yet another embodiment, a separate tender vehicle is replaced with energy capture and storage subsystems located on some or all of the load units attached to the locomotive. Such load units may optionally include separate traction motors. In each of the foregoing embodiments, the energy capture and storage subsystem can include one or more of the subsystems previously described.

When a separate energy tender vehicle (e.g., energy tender vehicle 202) is used, the tender vehicle 202 and the locomotive are preferably coupled electrically (e.g., via line 212) such that dynamic braking energy from the locomotive traction motors and/or from optional energy tender traction motors 208 is stored in energy storage means on board the tender. During motoring operations, the stored energy is selectively used to propel locomotive traction motors 108 and/or optional traction motors 208 of tender vehicle 202. Similarly, when the locomotive engine produces more power than required for motoring, the excess prime mover power can be stored in energy capture and storage 202 for later use.

If energy tender vehicle 202 is not electrically coupled to the locomotive (other than for standard control signals), traction motors 208 on the tender vehicle can also be used in an autonomous fashion to provide dynamic braking energy to be stored in energy capture and storage 204 for later use. One advantage of such a configuration is that tender vehicle 202 can be coupled to a wide variety of locomotives, in almost any consist.

It should be appreciated that when energy tender traction motors 208 operate in a dynamic braking mode, various reasons may counsel against storing the dynamic braking energy in energy capture and storage 204 (e.g., the storage may be full). Thus, it is preferable that some or all of such dynamic braking energy be dissipated by grids associated with energy tender vehicle 202 (not shown), or transferred to locomotive grids 110 (e.g., via line 212).

Figure 1B:
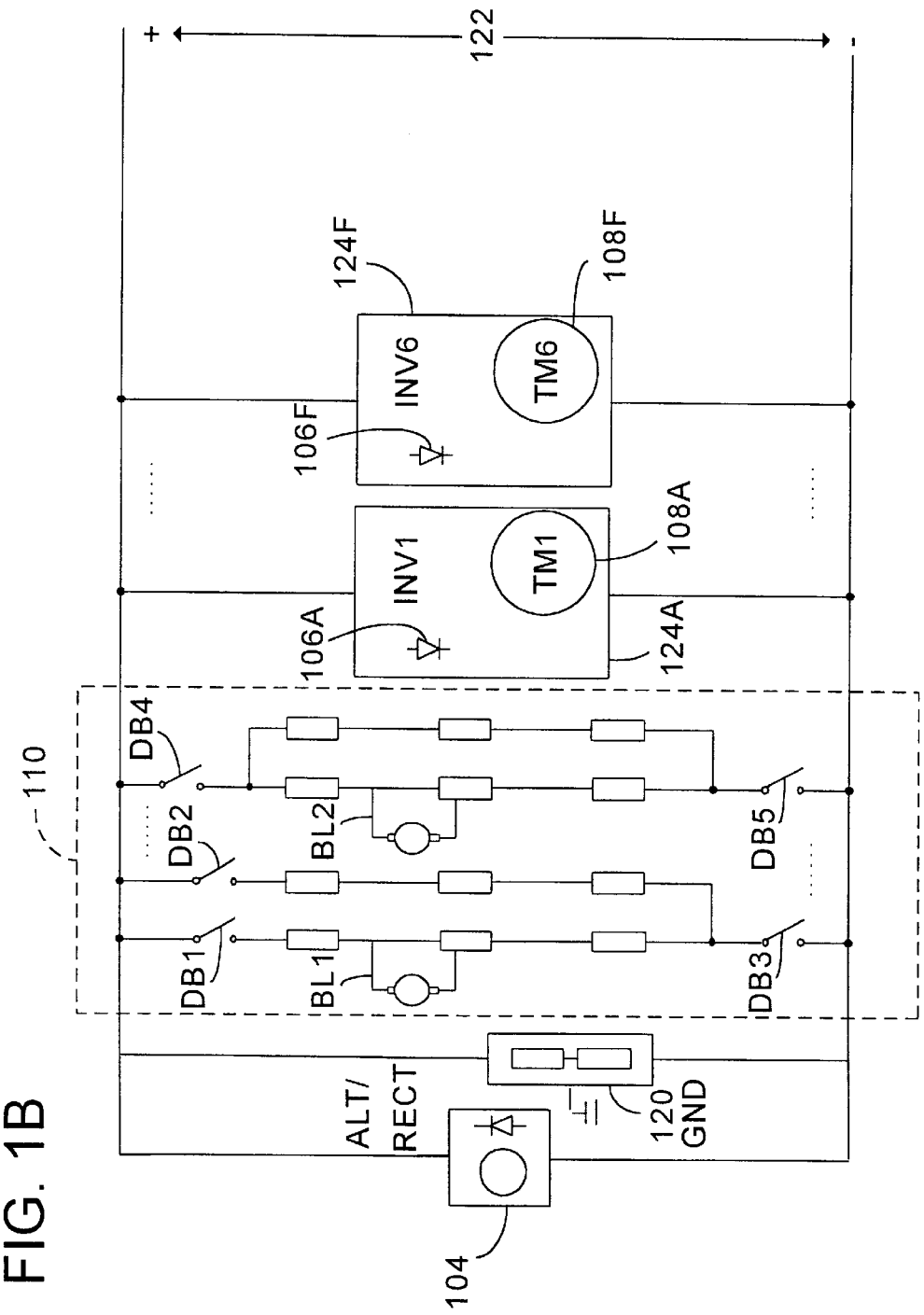
FIG. 1B is an electrical schematic of a prior art AC diesel-electric locomotive.

The embodiment of FIG. 2 will be further described in terms of one possible operational example. It is to be understood that this operational example does not limit the invention. The locomotive system 200 is configured in a consist including a locomotive (e.g., locomotive 100 of FIG. 1), an energy tender vehicle 202, and at least one load vehicle. The locomotive may be, for example, an AC diesel-electric locomotive. Tractive power for the locomotive is supplied by a plurality of locomotive traction motors 108. In one preferred embodiment, the locomotive has six axles, each axle includes a separate locomotive traction motor 108, and each traction motor 108 is an AC traction motor 108. The locomotive includes a diesel engine 102 that drives an electrical power system. More particularly, the diesel engine 102 drives an alternator/rectifier 104 that comprises a source of prime mover electrical power (sometimes referred to as traction power or primary power). In this particular embodiment, the prime mover electrical power is DC power which is converted to AC power for use by the traction motors 108. More specifically, one or more inverters (e.g., inverter 106) receive the prime mover electrical power and selectively supply AC power to the plurality of locomotive traction motors 108 to propel the locomotive. Thus, locomotive traction motors 108 propel the locomotive in response to the prime mover electrical power.

Each of the plurality of locomotive traction motors 108 is preferably operable in at least two operating modes, a motoring mode and a dynamic braking mode. In the motoring mode, the locomotive traction motors 108 receive electrical power (e.g., prime mover electrical power via inverters) to propel the locomotive. As described elsewhere herein, when operating in the dynamic braking mode, the traction motors 108 generate electricity. In the embodiment of FIG. 2, energy tender vehicle 202 is constructed and arranged to selectively capture and store a portion of the electricity generated by the traction motors 108 during dynamic braking operations. This is accomplished by energy capture and storage system 204. The captured and stored electricity is selectively used to provide a secondary source of electric power. This secondary source of electric power may be used to selectively supplement or replace the prime mover electrical power (e.g., to help drive one or more locomotive traction motors 108) and/or to drive one or more energy tender traction motors 208. In the latter case, energy tender traction motors 208 and locomotive traction motors 108 operate to propel the consist.

Advantageously, tender capture and storage 204 can store dynamic braking energy without any electrical power transfer connection with the primary locomotive. In other words, energy capture and storage 204 can be charged without a connection such as line 212. This is accomplished by operating the locomotive engine 102 to provide motoring power to locomotive traction motors 108 while operating tender vehicle 202 in a dynamic braking mode. For example, the locomotive engine 102 may be operated at a relatively high notch setting while tender vehicle traction motors 208 are configured for dynamic braking. Energy from the dynamic braking process can be used to charge energy capture and storage 204. Thereafter, the stored energy can be used to power energy tender traction motors 208 to provide additional motoring power to the train. One of the advantages of such a configuration is that tender vehicle 202 can be placed anyway in the train. For example, in one wireless embodiment, tender vehicle 202 provides its own local power (e.g., for controls or lighting) and communicates via a radio link with other vehicles in the train, as necessary. An air brake connection would likely also be connected to tender vehicle 202. Of course, minimal wiring such as standard lighting wiring and control wiring could be optionally routed to tender vehicle 202, if so desired.

It is known in the art that diesel-electric locomotives are often loud and the vibrations associated with the engine make the environment uncomfortable for train operators. Accordingly, in one embodiment, tender vehicle 202 is modified to include an operator compartment such that the train engineer can operate the train from the relative comfort of the tender, rather than from the locomotive. FIG. 2 reflects this schematically at the aft end of tender 202 with reference character 230.

Figure 3:
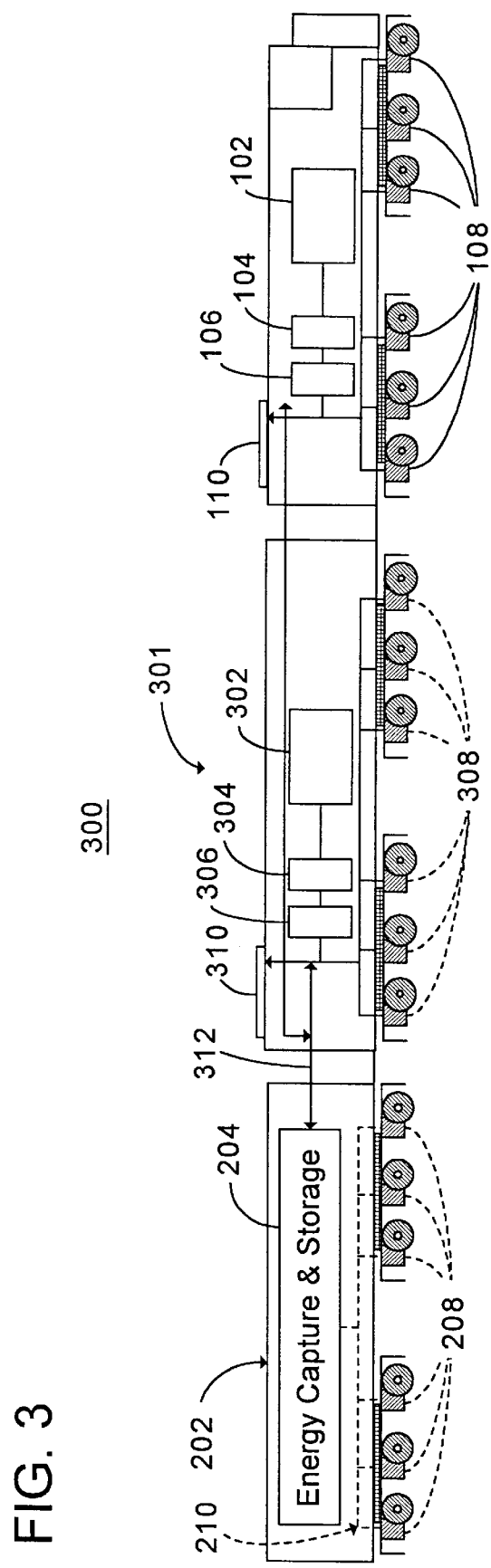
FIG. 3 is a block diagram of one embodiment of a hybrid energy locomotive system having a second engine for charging an energy storage system, including an energy storage system associated with an energy tender vehicle.

FIG. 3 is a block diagram of another embodiment of a hybrid energy locomotive system 300. This embodiment includes a second engine vehicle 301 for charging the energy tender vehicle 202. The second engine vehicle 301 comprises a diesel engine 302 that is preferably smaller than the main locomotive engine 102, but which otherwise operates according similar principles. For example, second engine vehicle 301 comprises an alternator/rectifier 304 (driven by the second engine 302), one or more inverters 306, and a plurality of braking grids 310. In one embodiment, second engine 302 runs at a constant speed to provide a constant charging source (e.g., 200–400 hp) for energy tender vehicle 202. Thus, when a hybrid energy locomotive system is configured as shown in FIG. 3, energy capture and storage 204 preferably receives charging energy from one or both of the primary locomotive (e.g., dynamic braking energy), and second engine vehicle 301 (e.g., direct charging) via line 312. It should be understood that, although second engine vehicle 301 is shown as a separate vehicle, it could also be included, for example, as an integral part of energy tender vehicle 202 or a load vehicle. Also, dynamic braking generators (e.g., via traction motors 308) could be optionally included with second engine 301 thereby providing an additional source of power for storage in energy capture and storage 204.

Figure 4:
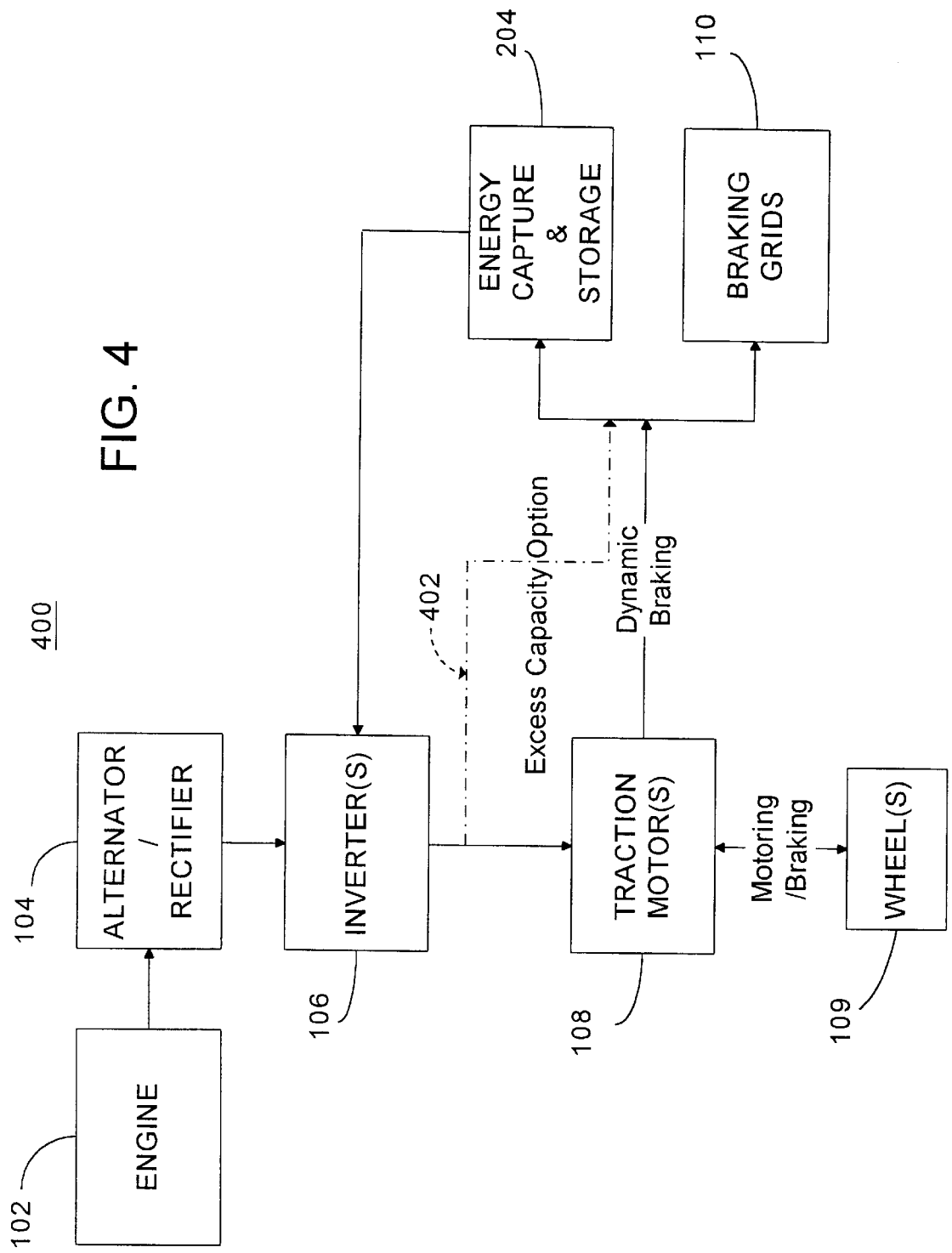
FIG. 4 is a block diagram illustrating one preferred embodiment of an energy storage and generation system suitable for use in connection with a hybrid energy locomotive system.

FIG. 4 is a system-level block diagram that illustrates aspects of one preferred energy storage and generation system. In particular, FIG. 4 illustrates an energy storage and generation system 400 suitable for use with a hybrid energy locomotive system, such as hybrid energy locomotive system 200 or system 300 (FIGS. 2 and 3). Such an energy storage and generation system 400 could be implemented, for example, as part of a separate energy tender vehicle (e.g., FIGS. 2 and 3) and/or incorporated into a locomotive.

As illustrated in FIG. 4, a diesel engine 102 drives a prime mover power source 104 (e.g., an alternator/rectifier converter). The prime mover power source 104 preferably supplies DC power to an inverter 106 that provides three-phase AC power to a locomotive traction motor 108. It should be understood, however, that the system 400 illustrated in FIG. 4 can be modified to operate with DC traction motors as well. Preferably, there are a plurality of traction motors (e.g., one per axle), and each axle is coupled to a plurality of locomotive wheels. In other words, each locomotive traction motor preferably includes a rotatable shaft coupled to the associated axle for providing tractive power to the wheels. Thus, each locomotive traction motor 108 provides the necessary motoring force to an associated plurality of locomotive wheels 109 to cause the locomotive to move.

When traction motors 108 are operated in a dynamic braking mode, at least a portion of the generated electrical power is routed to an energy storage medium such as energy storage 204. To the extent that energy storage 204 is unable to receive and/or store all of the dynamic braking energy, the excess energy is preferably routed to braking grids 110 for dissipation as heat energy. Also, during periods when engine 102 is being operated such that it provides more energy than needed to drive traction motors 108, the excess capacity (also referred to as excess prime mover electric power) may be optionally stored in energy storage 204. Accordingly, energy storage 204 can be charged at times other than when traction motors 108 are operating in the dynamic braking mode. This aspect of the system is illustrated in FIG. 4 by a dashed line 402.

The energy storage 204 of FIG. 4 is preferably constructed and arranged to selectively augment the power provided to traction motors 108 or, optionally, to power separate traction motors associated with a separate energy tender vehicle (see FIG. 2 above) or a load vehicle. Such power may be referred to as secondary electric power and is derived from the electrical energy stored in energy storage 204. Thus, the system 400 illustrated in FIG. 4 is suitable for use in connection with a locomotive having an on-board energy storage medium and/or with a separate energy tender vehicle.

Figure 5:
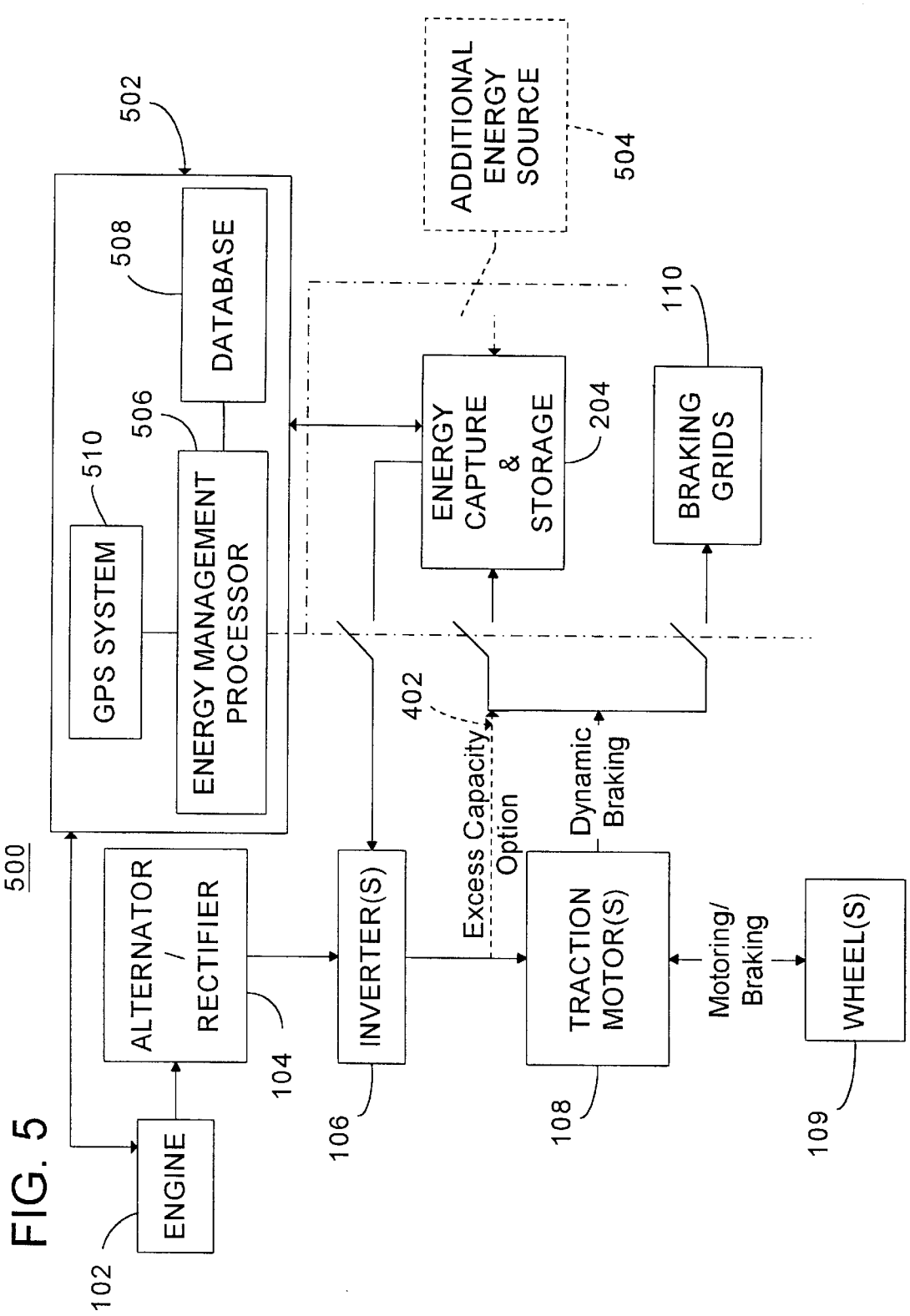
FIG. 5 is a block diagram illustrating an energy storage and generation system suitable for use in a hybrid energy locomotive system, including an energy management system for controlling the storage and regeneration of energy.

FIG. 5 is a block diagram that illustrates aspects of one preferred embodiment of an energy storage and generation system 500 suitable for use with a hybrid energy locomotive system. The system 500 includes an energy management system 502 for controlling the storage and regeneration of energy. It should be understood, however, that the energy management system 502 illustrated in FIG. 5 is also suitable for use with other large, off-highway vehicles that travel along a relatively well-defined course. Such vehicles include, for example, large excavators, excavation dump trucks, and the like. By way of further example, such large excavation dump trucks may employ motorized wheels such as the GEB23™ AC motorized wheel employing the GE150AC™ drive system (both of which are trademarked products available from the assignee of the present invention). Therefore, although FIG. 5 is generally described with respect to a locomotive system, the energy management system 500 illustrated therein is not to be considered as limited to locomotive applications.

Referring still to the exemplary embodiment illustrated in FIG. 5, system 500 preferably operates in the same general manner as system 400 of FIG. 4; the energy management system 502 provides additional intelligent control functions. FIG. 5 also illustrates an optional energy source 504 that is preferably controlled by the energy management system 502. The optional energy source 504 may be a second engine (e.g., the charging engine illustrated in FIG. 3 or another locomotive in the consist) or a completely separate power source (e.g., a wayside power source such as battery charger) for charging energy storage 204. In one embodiment, such a separate charger includes an electrical power station for charging an energy storage medium associated with a separate energy tender vehicle (e.g., vehicle 202 of FIG. 2) while stationary, or a system for charging the energy storage medium while the tender vehicle is in motion. In one preferred embodiment, optional energy source 504 is connected to a traction bus (not illustrated in FIG. 5) that also carries primary electric power from prime mover power source 104.

As illustrated, the energy management system 502 preferably includes an energy management processor 506, a database 508, and a position identification system 510, such as, for example, a global positioning satellite system receiver (GPS) 510. The energy management processor 506 determines present and anticipated train position information via the position identification system 510. In one embodiment, energy management processor 506 uses this position information to locate data in the database 508 regarding present and/or anticipated track topographic and profile conditions, sometimes referred to as track situation information. Such track situation information may include, for example, track grade, track elevation (e.g., height above mean sea level), track curve data, tunnel information, speed limit information, and the like. It is to be understood that such database information could be provided by a variety of sources including: an onboard database associated with processor 510, a communication system (e.g., a wireless communication system) providing the information from a central source, manual operator input(s), via one or more wayside signaling devices, a combination of such sources, and the like. Finally, other vehicle information such as, the size and weight of the vehicle, a power capacity associated with the prime mover, efficiency ratings, present and anticipated speed, present and anticipated electrical load, and so on may also be included in a database (or supplied in real or near real time) and used by energy management processor 506. It should be appreciated that, in an alternative embodiment, energy management system 502 could be configured to determine power storage and transfer requirements associated with energy storage 204 in a static fashion. For example, energy management processor 506 could be preprogrammed with any of the above information, or could use look-up tables based on past operating experience (e.g., when the vehicle reaches a certain point, it is nearly always necessary to store additional energy to meet an upcoming demand).

The energy management processor 506 preferably uses the present and/or upcoming track situation information, along with vehicle status information, to determine power storage and power transfer requirements. Energy management processor 506 also determines possible energy storage opportunities based on the present and future track situation information. For example, based on the track profile information, energy management processor 506 may determine that it is more efficient to completely use all of the stored energy, even though present demand is low, because a dynamic braking region is coming up (or because the train is behind schedule and is attempting to make up time). In this way, the energy management system 502 improves efficiency by accounting for the stored energy before the next charging region is encountered. As another example, energy management processor 506 may determine not to use stored energy, despite present demand, if a heavier demand is upcoming. Advantageously, energy management system 502 may also be configured to interface with engine controls. Also, as illustrated in FIG. 5, energy storage 204 may be configured to provide an intelligent control interface 512 with energy management system 502.

In operation, energy management processor 506 determines a power storage requirement and a power transfer requirement. Energy storage 204 stores electrical energy in response to the power storage requirement. Energy storage 204 provides secondary electric power (e.g. to a traction bus connected to inverters 106 to assist in motoring) in response to the power transfer requirement. The secondary electric power is derived from the electrical energy stored in energy storage 204.

As explained above, energy management processor 506 preferably detemines the power storage requirement based, in part, on a situation parameter indicative of a present and/or anticipated track topographic characteristic. Energy management processor 506 may also determine the power storage requirement as a function of an amount of primary electric power available from the prime mover power source 104. Similarly, energy management processor 506 may determine the power storage requirement as a function of a present or anticipated amount of primary electric power required to propel the locomotive system.

Also, in determining the energy storage requirement, energy management processor 506 preferably considers various parameters related to energy storage 204. For example, energy storage 204 will have a storage capacity that is indicative of the amount of power that can be stored therein and/or the amount of power that can be transferred to energy storage 204 at any given time. Another similar parameter relates to the amount of secondary electric power that energy storage 204 has available for transfer at a particular time.

As explained above, system 500 preferably includes a plurality of sources for charging energy storage 204. These sources include dynamic braking power, excess prime mover electric power, and external charging electric power. Preferably, energy management processor 506 determines which of these sources should charge energy storage 204. In one embodiment, present or anticipated dynamic braking energy is used to charge energy storage 204, if such dynamic braking energy is available. If dynamic braking energy is not available, either excess prime mover electric power or external charging electric power is used to charge energy storage 204.

In the embodiment of FIG. 5, energy management processor 506 preferably determines the power transfer requirement as a function of a demand for power. In other words, energy storage 204 preferably does not supply secondary electric power unless traction motors 108 are operating in a power consumption mode (i.e., a motoring mode, as opposed to a dynamic braking mode). In one form, energy management processor 506 permits energy storage 204 to supply secondary electric power to inverters 106 until either (a) the demand for power terminates or (b) energy storage 204 is completely depleted. In another form, however, energy management processor 506 considers anticipated power demands and controls the supply of secondary electric power from energy storage 204 such that sufficient reserve power remains in energy storage 204 to augment prime mover power source during peak demand periods. This may be referred to as a "look ahead" energy management scheme.

In the look ahead energy management scheme, energy management processor 506 preferably considers various present and/or anticipated track situation parameters, such as those discussed above. In addition, energy management processor may also consider the amount of power stored in energy storage 204, anticipated charging opportunities, and any limitations on the ability to transfer secondary electric power from energy storage 204 to inverters 106.

FIGS. 6A–D, 7A–D, and 8A–E illustrate, in graphic form, aspects of three different embodiments of energy management systems, suitable for use with a hybrid energy vehicle, that could be implemented in a system such as system 500 of FIG. 5. It should be appreciated that these figures are provided for exemplary purposes and that, with the benefit of the present disclosure, other variations are possible. It should also be appreciated that the values illustrated in these figures are included to facilitate a detailed description and should not be considered in a limiting sense. It should be further understood that, although the examples illustrated in these figures relate to locomotives and trains, the energy management system and methods identified herein may be practiced with a variety of large, off-highway vehicles that traverse a known course and which are generally capable of storing the electric energy generated during the operation of such vehicles. Such off-highway vehicles include vehicles using DC and AC traction motor drives and having dynamic braking/retarding capabilities.

There are four similar charts in each group of figures (FIGS. 6A–D, FIGS. 7A–D, and FIGS. 8A–D). The first chart in each group (i.e., FIGS. 6A, 7A, and 8A) illustrates the required power for both motoring and braking. Thus, the first chart graphically depicts the amount of power required by the vehicle. Positive values on the vertical axis represent motoring power (horsepower); negative values represent dynamic braking power. It should be understood that motoring power could originate with the prime mover (e.g., diesel engine in a locomotive), or from stored energy (e.g., in an energy storage medium in a separate energy tender vehicle or in a locomotive), or from a combination of the prime mover and stored energy. Dynamic braking power could be dissipated or stored in the energy storage medium.

The horizontal axis in all charts reflects time in minutes. The time bases for each chart in a given figure group are intended to be the same. It should be understood, however, that other reference bases are possible.

The second chart in each group of figures (i.e., FIGS. 6B, 7B, and 8B) reflects theoretical power storage and consumption. Positive values reflect the amount of power that, if power were available in the energy storage medium, could be drawn to assist in motoring. Negative values reflect the amount of power that, if storage space remains in the energy storage medium, could be stored in the medium. The amount of power that could be stored or drawn is partially a function of the converter and storage capabilities of a given vehicle configuration. For example, the energy storage medium will have some maximum/finite capacity. Further, the speed at which the storage medium is able to accept or supply energy is also limited (e.g., batteries typically charge slower than flywheel devices). Other variables also affect energy storage. These variables include, for example, ambient temperature, the size and length of any interconnect cabling, current and voltage limits on dc-to-dc converters used for battery charging, power ratings for an inverter for a flywheel drive, the charging and discharging rates of a battery, or a motor/shaft limit for a flywheel drive. The second chart assumes that the maximum amount of power that could be transferred to or from the energy storage medium at a given time is 500 h.p. Again, it should be understood that this 500 h.p. limit is included for exemplary purposes. Hence, the positive and negative limits in any given system could vary as a function of ambient conditions, the state and type of the energy storage medium, the type and limits of energy conversion equipment used, and the like.

The third chart in each figure group (i.e., FIGS. 6C, 7C, and 8C) depicts a power transfer associated with the energy storage medium. In particular, the third chart illustrates the actual power being transferred to and from the energy storage medium versus time. The third chart reflects limitations due to the power available for storage, and limitations due to the present state of charge/storage of the energy storage medium (e.g., the speed of the flywheel, the voltage in an ultracapacitor, the charge in the battery, and the like).

The fourth chart in each figure group (i.e., FIGS. 6D, 7D, and 8D) depicts actual energy stored. In particular, the fourth chart illustrates the energy stored in the energy storage medium at any particular instant in time.

Referring first to FIGS. 6A–D, these figures reflect an energy management system that stores energy at the maximum rate possible during dynamic braking until the energy storage medium is completely full. In this embodiment, all energy transfers to the storage medium occur during dynamic braking. In other words, in the embodiment reflected in FIGS. 6A–D, no energy is transferred to the energy storage medium from excess prime mover power available during motoring, or from other energy sources. Similarly, energy is discharged, up to the maximum rate, whenever there is a motor demand (limited to and not exceeding the actual demand) until the energy storage medium is completely discharged/empty. FIGS. 6A–D assume that the energy storage medium is completely discharged/empty at time 0.

Figure 6A:
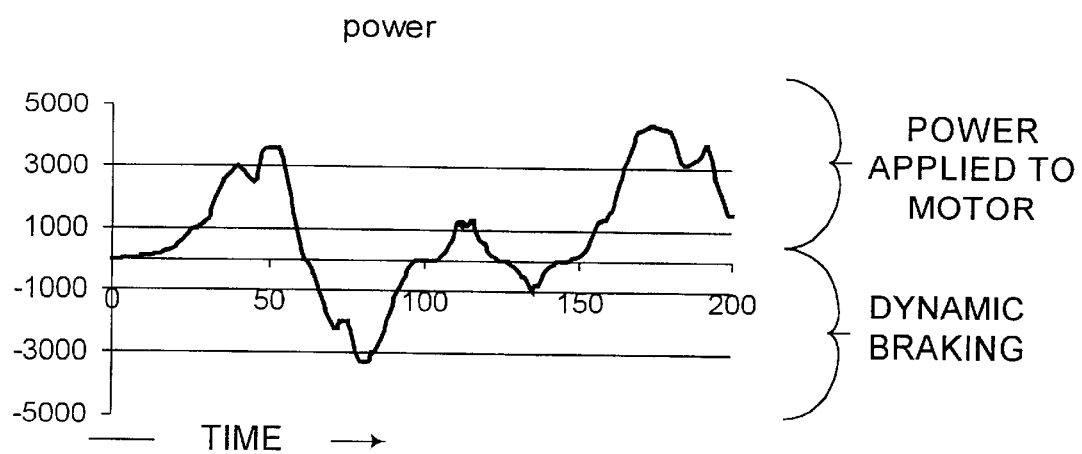
FIGS. 6A–6D are timing diagrams that illustrate one embodiment of an energy management system for controlling the storage and regeneration of energy, including dynamic braking energy.

Referring now specifically to FIG. 6A, as mentioned above, the exemplary curve identified therein illustrates the power required (utilized) for motoring and dynamic braking. Positive units of power reflect when motoring power is being applied to the wheels of the vehicle (e.g., one or more traction motors are driving locomotive wheels). Negative units of power reflect power generated by dynamic braking.

Figure 6B:
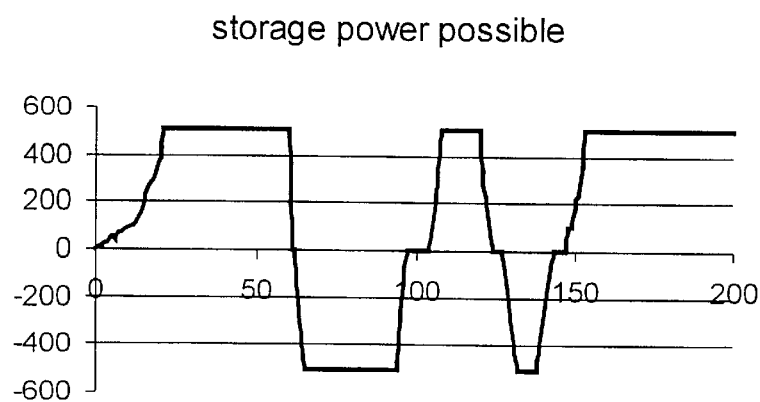

FIG. 6B is an exemplary curve that reflects power transfer limits. Positive values reflect the amount of stored energy that would be used to assist in the motoring effort, if such energy were available. Negative units reflect the amount of dynamic braking energy that could be stored in the energy storage medium if the medium were able to accept the full charge available. In the example of FIG. 6B, the energy available for storage at any given time is illustrated as being limited to 500 units (e.g., horsepower). As explained above, a variety of factors limit the amount of power that can be captured and transferred. Thus, from about 0 to 30 minutes, the locomotive requires less than 500 h.p. If stored energy were available, it could be used to provide all of the motoring power. From about 30 minutes to about 65 or 70 minutes, the locomotive requires more than 500 h.p. Thus, if stored energy were available, it could supply some (e.g., 500 h.p.) but not all of the motoring power. From about 70 minutes to about 75 minutes or so, the locomotive is in a dynamic braking mode and generates less than 500 h.p. of dynamic braking energy. Thus, up to 500 h.p. of energy could be transferred to the energy storage medium, if the medium retained sufficient capacity to store the energy. At about 75 minutes, the dynamic braking process generates in excess of 500 h.p. Because of power transfer limits, only up to 500 h.p. could be transferred to the energy storage medium (again, assuming that storage capacity remains); the excess power would be dissipated in the braking grids. It should be understood that FIG. 6B does not reflect the actual amount of energy transferred to or from the energy storage medium. That information is depicted in FIG. 6C.

Figure 6C:
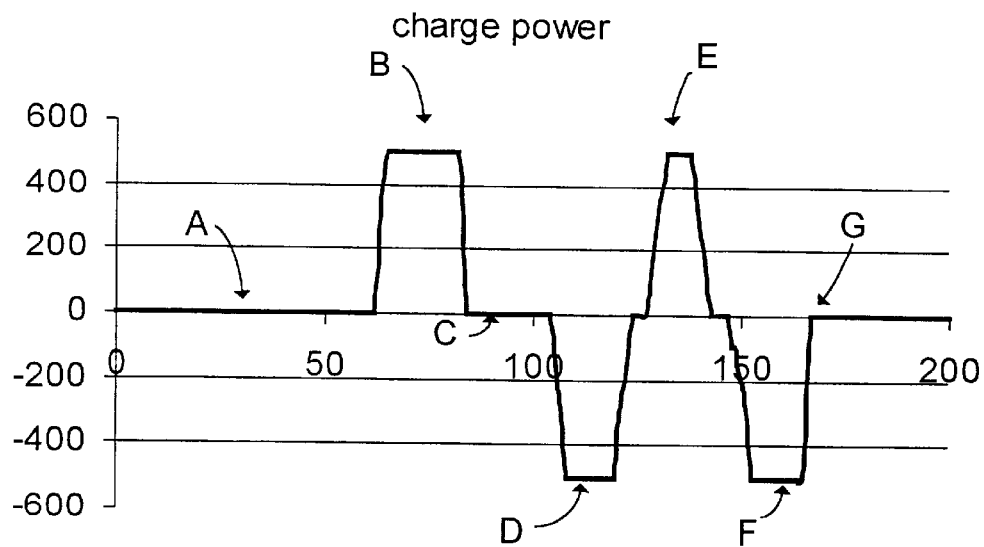

FIG. 6C is reflects the power transfer to/from the energy storage medium at any given instant of time. The example shown therein assumes that the energy storage medium is completely empty at time 0. Therefore, the system cannot transfer any power from the storage at this time. During a first time period A (from approximately 0–70 minutes), the vehicle is motoring (see FIG. 6A) and no power is transferred to or from the energy storage. At the end of the first time period A, and for almost 30 minutes thereafter, the vehicle enters a dynamic braking phase (see FIG. 6A). During this time, power from the dynamic braking process is available for storage (see FIG. 6B).

During a second time period B (from approximately 70–80 minutes), dynamic braking energy is transferred to the energy storage medium at the maximum rate (e.g., 500 units) until the storage is full. During this time there is no motoring demand to deplete the stored energy. Thereafter, during a third time period C (from approximately 80–105 minutes), the storage is full. Consequently, even though the vehicle remains in the dynamic braking mode or is coasting (see FIG. 6A), no energy is transferred to or from the energy storage medium during time period C.

During a fourth time period D (from approximately 105–120 minutes), the vehicle resumes motoring. Because energy is available in the energy storage medium, energy is drawn from the storage and used to assist the motoring process. Hence, the curve illustrates that energy is being drawn from the energy storage medium during the fourth time period D.

At approximately 120 minutes, the motoring phase ceases and, shortly thereafter, another dynamic braking phase begins. This dynamic braking phase reflects the start of a fifth time period E which lasts from approximately 125–145 minutes. As can be appreciated by viewing the curve during the fifth time period E, when the dynamic braking phase ends, the energy storage medium is not completely charged.

Shortly before the 150 minute point, a sixth time period F begins which lasts from approximately 150–170 minutes. During this time period and thereafter (see FIG. 6A), the vehicle is motoring. From approximately 150–170 minutes, energy is transferred from the energy storage medium to assist in the motoring process. At approximately 170 minutes, however, the energy storage is completely depleted. Accordingly, from approximately 170–200 minutes (the end of the sample window), no energy is transferred to or from the energy storage medium.

Figure 6D:
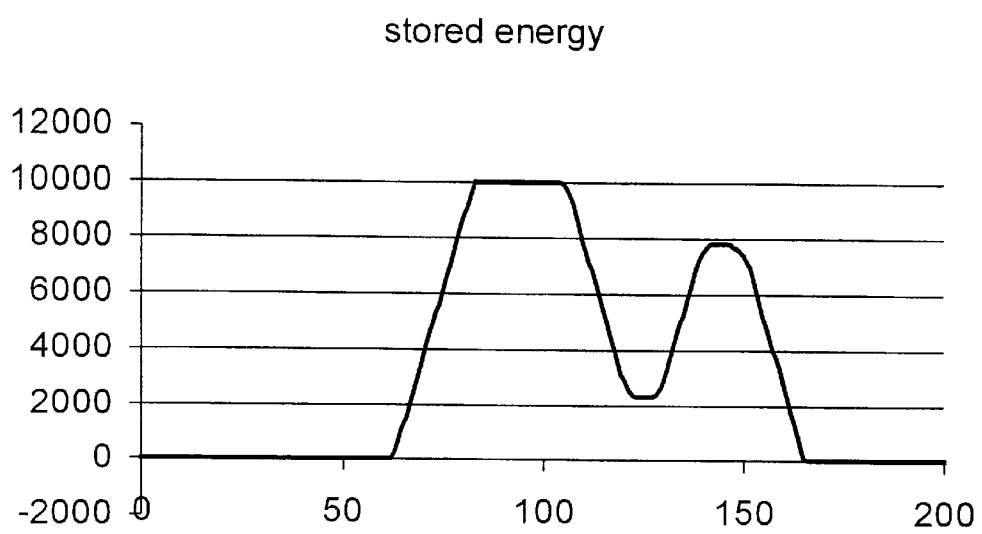

FIG. 6D illustrates the energy stored in the energy storage medium of the exemplary embodiment reflected in FIGS. 6A–D. Recall that in the present example, the energy storage medium is assumed to be completely empty/discharged at time 0. Recall also that the present example assumes an energy management system that only stores energy from dynamic braking. From approximately 0–70 minutes, the vehicle is motoring and no energy is transferred to or from the energy storage medium. From approximately 70–80 minutes or so, energy from dynamic braking is transferred to the energy storage medium until it is completely full. At approximately 105 minutes, the vehicle begins another motoring phase and energy is drawn from the energy storage medium until about 120 minutes. At about 125 minutes, energy from dynamic braking is again transferred to the energy storage medium during another dynamic braking phase. At about 145 minutes or so, the dynamic braking phase ends and storage ceases. At about 150 minutes, energy is drawn from the energy storage medium to assist in motoring until all of the energy has been depleted at approximately 170 minutes.

FIGS. 7A–D correspond to an energy management system that includes a "look ahead" or anticipated needs capability. Such a system is unlike the system reflected in FIGS. 6A–D, which simply stores dynamic braking energy when it can, and uses stored energy to assist motoring whenever such stored energy is available. The energy management system reflected by the exemplary curves of FIGS. 7A–D anticipates when the prime mover cannot produce the full required demand, or when it may be less efficient for the prime mover to produce the full required demand. As discussed elsewhere herein, the energy management system can make such determinations based on, for example, known present position, present energy needs, anticipated future track topography, anticipated future energy needs, present energy storage capacity, anticipated energy storage opportunities, and like considerations. The energy management system depicted in FIGS. 7A–D, therefore, preferably prevents the energy storage medium from becoming depleted below a determined minimum level required to meet future demands.

By way of further example, the system reflected in FIGS. 7A–D is premised on a locomotive having an engine that has a "prime mover limit" of 4000 h.p. Such a limit could exist for various factors. For example, the maximum rated output could be 4000 h.p., or operating efficiency considerations may counsel against operating the engine above 4000 h.p. It should be understood, however, that the system and figures are intended to reflect an exemplary embodiment only, and are presented herein to facilitate a detailed explanation of aspects of an energy management system suitable for use with off-highway hybrid energy vehicles such as, for example, the locomotive system illustrated in FIG. 2.

Referring now to FIG. 7A, the exemplary curve illustrated therein depicts a the power required for motoring (positive) and braking (negative). At approximately 180 minutes, the motoring demand exceeds 4000 h.p. Thus, the total demand at that time exceeds the 4000 h.p. operating constraint for the engine. The "look ahead" energy management system reflected in FIGS. 7A–D, however, anticipates this upcoming need and ensures that sufficient secondary power is available from the energy storage medium to fulfil the energy needs.

One way for the energy management system to accomplish this is to look ahead (periodically or continuously) to the upcoming track/course profile (e.g., incline/decline, length of incline/decline, and the like) for a given time period (also referred to as a look ahead window). In the example illustrated in FIGS. 7A–D, the energy management system looks ahead 200 minutes and then computes energy needs/requirements backwards. The system determines that, for a brief period beginning at 180 minutes, the engine would require more energy than the preferred limit.

FIG. 7B is similar to FIG. 6B. FIG. 7B, however, also illustrates the fact that the energy storage medium is empty at time 0 and, therefore, there can be no power transfer from the energy storage medium unless and until it is charged. FIG. 7B also reflects a look ahead capability.

Comparing FIGS. 6A–D with FIGS. 7A–D, it is apparent how the systems respectively depicted therein differ. Although the required power is the same in both examples (see FIGS. 6A and 7A), the system reflected in FIGS. 7A–D prevents complete discharge of the energy storage medium prior to the anticipated need at 180 minutes. Thus, as can be seen in FIGS. 7C and 7D, prior to the 180 minute point, the system briefly stops transferring stored energy to assist in motoring, even though additional stored energy remains available. The additional energy is thereafter transferred, beginning at about 180 minutes, to assist the prime mover when the energy demand exceeds 4000 h.p. Hence, the system effectively reserves some of the stored energy to meet upcoming demands that exceed the desired limit of the prime mover.

It should be understood and appreciated that the energy available in the energy storage medium could be used to supplement driving traction motors associated with the prime mover, or could also be used to drive separate traction motors (e.g., on a tender or load vehicle). With the benefit of the present disclosure, an energy management system accommodating a variety of configurations is possible.

FIGS. 8A–E reflect pertinent aspects of another embodiment of an energy management system suitable for use in connection with off-highway hybrid energy vehicles. The system reflected in FIGS. 8A–E includes a capability to store energy from both dynamic braking and from the prime mover (or another charging engine such as that illustrated in FIG. 3). For example, a given engine may operate most efficiently at a given power setting (e.g., 4000 h.p.). Thus, it may be more efficient to operate the engine at 4000 h.p. at certain times, even when actual motoring demand falls below that level. In such cases, the excess energy can be transferred to an energy storage medium.

Thus, comparing FIGS. 8A–D with FIGS. 6A–D and 7A–D, the differences between the systems respectively depicted therein become apparent. Referring specifically to FIGS. 8A and 8D, from about 0–70 minutes, the motoring requirements (FIG. 8A) are less than the exemplary optimal 4000 h.p. setting. If desirable, the engine could be run at 4000 h.p. during this time and the energy storage medium could be charged. As illustrated, however, the energy management system determines that, based on the upcoming track profile and anticipated dynamic braking period(s), an upcoming dynamic braking process will be able to fully charge the energy storage medium. In other words, it is not necessary to operate the engine at 4000 h.p. and store the excess energy in the energy storage medium during this time because an upcoming dynamic braking phase will supply enough energy to fully charge the storage medium. It should be understood that the system could also be designed in other ways. For example, in another configuration the system always seeks to charge the storage medium whenever excess energy could be made available.

At approximately 180 minutes, power demands will exceed 4000 h.p. Thus, shortly before that time (while motoring demand is less than 4000 h.p.), the engine can be operated at 4000 h.p., with the excess energy used to charge the energy storage medium to ensure sufficient energy is available to meet the demand at 180 minutes. Thus, unlike the systems reflected in FIGS. 6D and 7D, the system reflected in FIG. 8D provides that, for a brief period prior to 180 minutes, energy is transferred to the energy storage medium from the prime mover, even though the vehicle is motoring (not braking).

Figure 8E:
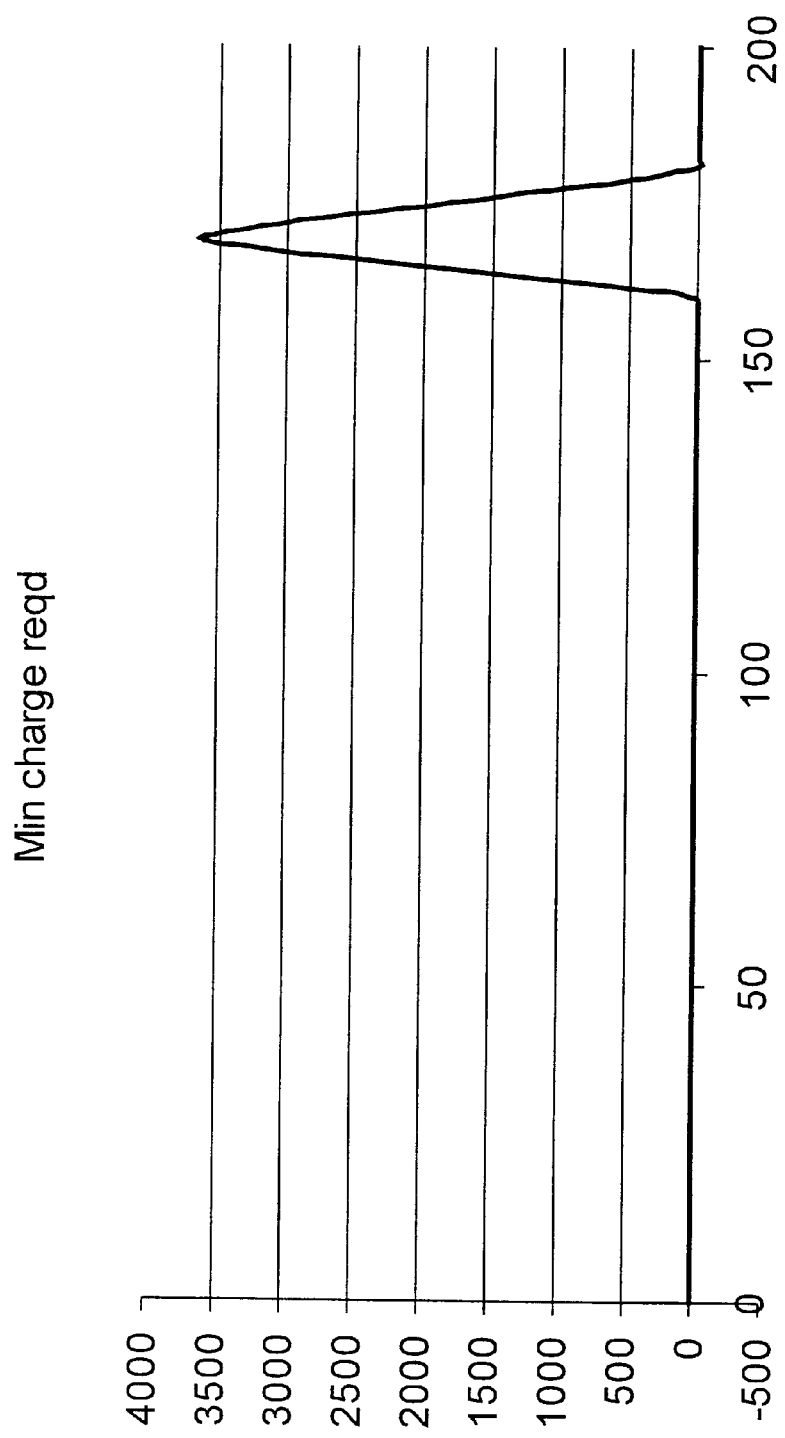

FIG. 8E illustrates one way that the energy management system can implement the look ahead capability to control energy storage and transfer in anticipation of future demands. FIG. 8E assumes a system having a 200 minute look ahead window. Such a look ahead window is chosen to facilitate an explanation of the system and should not be viewed in a limiting sense. Beginning at the end of the window (200 minutes), the system determines the power/energy demands at any given point in time. If the determined demand exceeds the prime mover's capacity or limit, the system continues back and determines opportunities when energy can be stored, in advance of the determined excess demand period, and ensures that sufficient energy is stored during such opportunities.

Although FIGS. 6A–D, 7A–D, and 8A–E have been separately described, it should be understood that the systems reflected therein could be embodied in a single energy management system. Further, the look ahead energy storage and transfer capability described above could be accomplished dynamically or in advance. For example, in one form, an energy management processor (see FIG. 5) is programmed to compare the vehicle's present position with upcoming track/course characteristics in real or near real time. Based on such dynamic determinations, the processor then determines how to best manage the energy capture and storage capabilities associated with the vehicle in a manner similar to that described above with respect to FIGS. 7A–D and 8A–E. In another form, such determinations are made in advance. For example, an off-vehicle planning computer may be used to plan a route and determine energy storage and transfer opportunities based on a database of known course information and projected conditions such as, for example, vehicle speed, weather conditions, and the like. Such pre-planned data would thereafter be used by the energy management system to manage the energy capture and storage process. Look ahead planning could also be done based on a route segment or an entire route.

It should further be understood that the energy management system and methods described herein may be put into practice with a variety of vehicle configurations. For example, such systems and methods could be practiced with a locomotive having a separate energy tender vehicle housing the energy capture and storage medium. As another example, the energy management systems and methods herein described could be employed with a locomotive having a separate energy tender vehicle that employs its own traction motors. In another example, the energy management systems and methods described herein may be employed as part of an off-highway vehicle, such as a locomotive, in which the energy storage medium is included as part of the vehicle itself. Other possible embodiments and combinations should be appreciated from the present disclosure and need not be recited in additional detail herein.

FIGS. 9A–9G are electrical schematics illustrating several different embodiments of an electrical system suitable for use in connection with a hybrid energy locomotive. In particular, the exemplary embodiments illustrated in these figures relate to a hybrid energy diesel-electric locomotive system. It should be understood that the embodiments illustrated in FIGS. 9A–9G could be incorporated in a plurality of configurations, including those already discussed herein (e.g., a locomotive with a separate energy tender vehicle, a locomotive with a self-contained hybrid energy system, an autonomous tender vehicle, and the like).

Figure 9A:
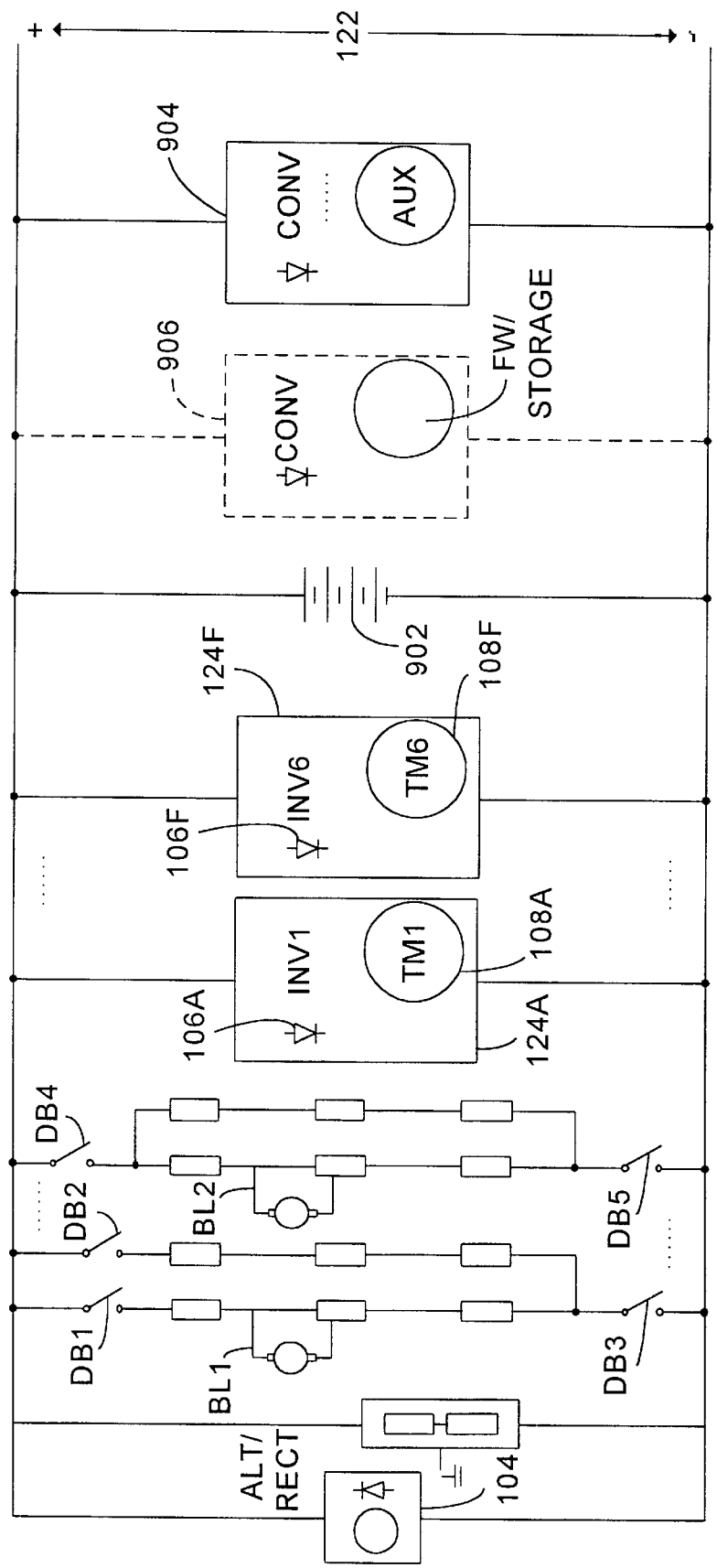
FIGS. 9A–9G are electrical schematics illustrating several embodiments of an electrical system suitable for use in connection with a hybrid energy off-highway vehicle, such as a diesel-electric locomotive.

FIG. 9A illustrates an electrical schematic of a locomotive electrical system having a energy capture and storage medium suitable for use in connection with aspects of the systems and methods disclosed herein. The particular energy storage element illustrated in FIG. 9A comprises a battery storage 902. The battery storage 902 is preferably connected directly across the traction bus (DC bus 122). In this exemplary embodiment, an auxiliary power drive 904 is also connected directly across DC bus 122. The power for the auxiliaries is derived from DC bus 122, rather than a separate bus.

It should be appreciated that more than one type of energy storage element may be employed in addition to battery storage 902. For example, an optional flywheel storage element 906 can also be connected in parallel with battery storage 902. The flywheel storage 906 shown in FIG. 9A is preferably powered by an AC motor or generator connected to DC bus 122 via an inverter or converter. Other storage elements such as, for example, capacitor storage devices (including ultra-capacitors) and additional battery storages (not shown) can also be connected across the DC bus and controlled using choppers and/or converters and the like. It should be understood that although battery storage 902 is schematically illustrated as a single battery, multiple batteries or battery banks may likewise be employed.

In operation, the energy storage elements (e.g., battery storage 902 and/or any optional energy storage elements such as flywheel 906) are charged directly during dynamic braking operations. Recall that, during dynamic braking, one or more of the traction motor subsystems (e.g., 124A–124F) operate as generators and supply dynamic braking electric power which is carried on DC bus 122. Thus, all or a portion of the dynamic braking electric power carried on DC bus 122 may be stored in the energy storage element because the power available on the bus exceeds demand. When the engine is motoring, the battery (and any other optional storage element) is permitted to discharge and provide energy to DC bus 122 that can be used to assist in driving the traction motors. This energy provided by the storage element may be referred to as secondary electric power. Advantageously, because the auxiliaries are also driven by the same bus in this configuration, the ability to take power directly from DC bus 122 (or put power back into bus 122) is provided. This helps to minimize the number of power conversion stages and associated inefficiencies due to conversion losses. It also reduces costs and complexities.

It should be appreciated that the braking grids may still be used to dissipate all or a portion of the dynamic braking electric power generated during dynamic braking operations. For example, an energy management system is preferably used in connection with the system illustrated in FIG. 9A. Such an energy management system is configured to control one or more of the following functions: energy storage; stored energy usage; and energy dissipation using the braking grids. It should further be appreciated that the battery storage (and/or any other optional storage element) may optionally be configured to store excess prime mover electric power that is available on the traction bus.

Those skilled in the art should appreciate that certain circumstances preclude the operation of a diesel engine when the locomotive and/or train need to be moved. For example, the engine may not be operable. As another example, various rules and concerns may prevent the operation of the engine inside buildings, yards, maintenance facilities, or tunnels. In such situations, the train is moved using stored battery power. Advantageously, various hybrid energy locomotive configurations disclosed herein permit the use of stored power for battery jog operations directly. For example, the battery storage 902 of FIG. 9A can be used for battery jog operations. Further, the prior concept of battery jog operations suggests a relatively short time period over a short distance. The various configurations disclosed herein permit jog operations for much longer time periods and over much longer distances.

Figure 9B:
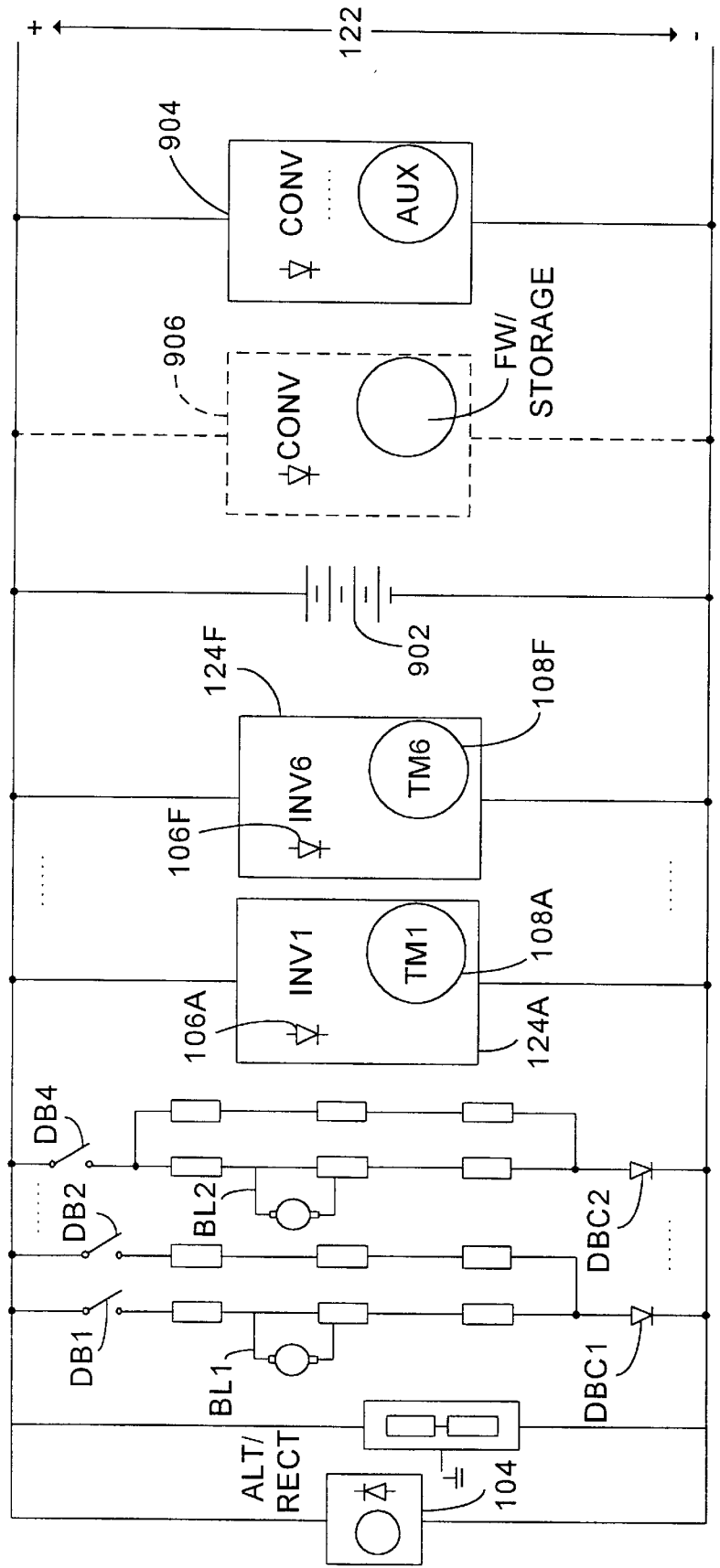

FIG. 9B illustrates a variation of the system of FIG. 9A. A primary difference between FIGS. 9A and 9B is that the system shown in FIG. 9B includes chopper circuits DBC1 and DBC2 connected in series with the braking grids. The chopper circuits DBC1 and DBC2 allow fine control of power dissipation through the girds which, therefore, provides greater control over the storage elements such as, for example, battery storage 902. In one embodiment, chopper circuits DBC1 and DBC2 are controlled by an energy management system (see FIG. 5). It should also be appreciated that chopper circuits DBC1 and DBC2, as well as any optional storage devices added to the circuit (e.g., flywheel storage 906), could also be used to control transient power.

In the configuration of FIG. 9A, the dynamic braking contactors (e.g., DB1, DB2) normally only control the dynamic braking grids in discrete increments. Thus, the power flowing into the grids is also in discrete increments (assuming a fixed DC voltage). For example, if each discrete increment is 1000 h.p., the battery storage capability is 2000 h.p., and the braking energy returned is 2500 h.p., the battery cannot accept all of the braking energy. As such, one string of grids is used to dissipate 1000 h.p., leaving 1500 h.p. for storage in the battery. By adding choppers DBC1, DBC2, the power dissipated in each grid string can be more closely controlled, thereby storing more energy in the battery and improving efficiency. In the foregoing example, choppers DBC1 and DBC2 can be operated at complementary 50% duty cycles so that only 500 h.p. of the braking energy is dissipated in the grids and 2000 h.p. is stored in the battery.

Figure 9C:
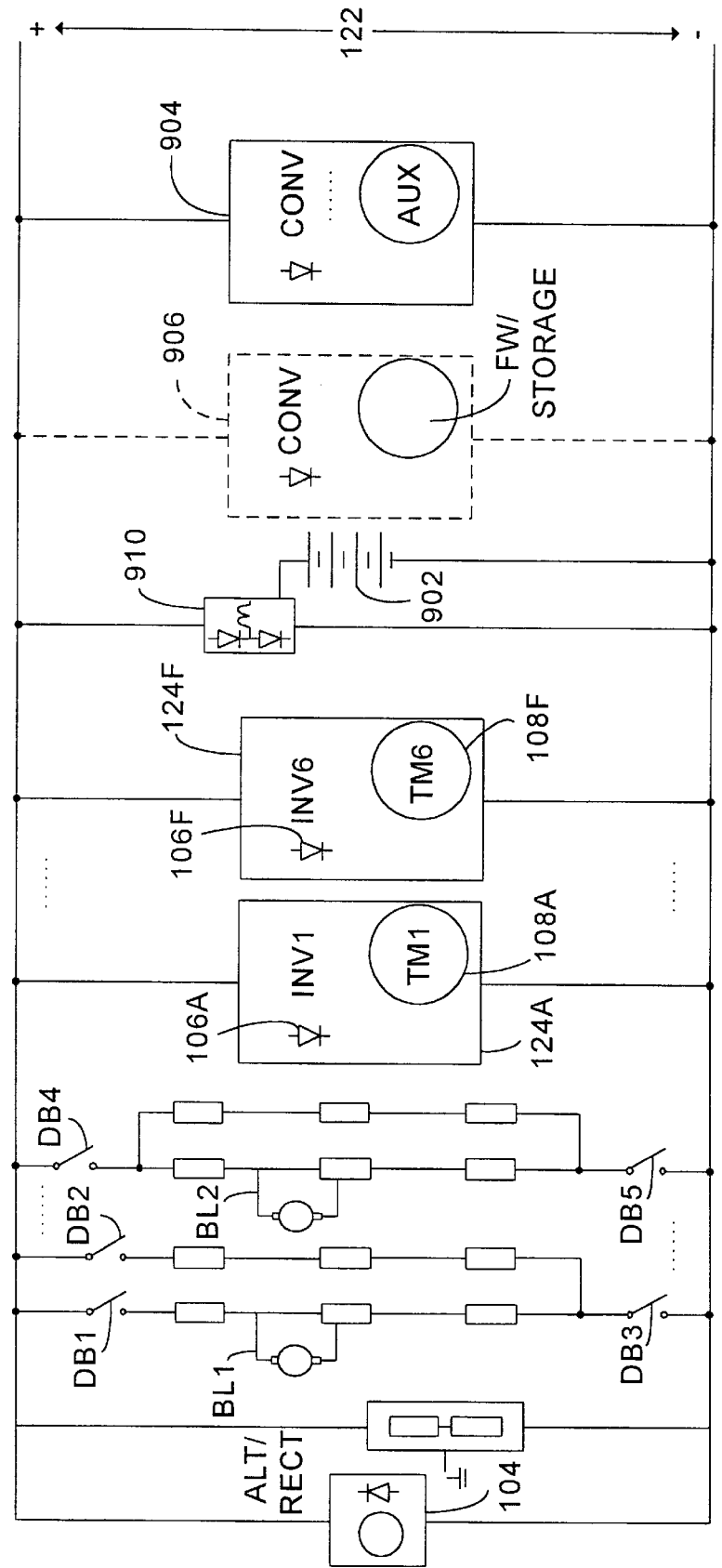

FIG. 9C is an electrical schematic of a locomotive electrical system illustrating still another configuration for implementing an energy storage medium. In contrast to the systems illustrated in FIGS. 9A and 9B. The battery storage 902 of FIG. 9C is connected to DC bus 122 by way of a dc-to-dc converter 910. Such a configuration accommodates a greater degree of variation between DC bus 122 voltage and the voltage rating of battery storage 902. Multiple batteries and/or DC storage elements (e.g., capacitors) could be connected in a similar manner. Likewise, chopper control, such as that illustrated in FIG. 9B could be implemented as part of the configuration of FIG. 9C. It should be further understood that the dc-to-dc converter 910 may be controlled via an energy management processor (see FIG. 5) as part of an energy management system and process that controls the storage and regeneration of energy in the energy storage medium.

In operation, the electric power carried on DC bus 122 is provided at a first power level (e.g., a first voltage level). The dc-to-dc converter 910 is electrically coupled to DC bus 122. The dc-to-dc converter 910 receives the electric power at the first power level and converts it to a second power level (e.g., a second voltage level). In this way, the electric power stored in battery storage 902 is supplied at the second power level. It should be appreciated that the voltage level on DC bus 122 and the voltage supplied to battery storage 902 via dc-to-dc converter 910 may also be at the same power level. The provision of dc-to-dc converter 910, however, accommodates variations between these respective power levels.

Figure 9D:
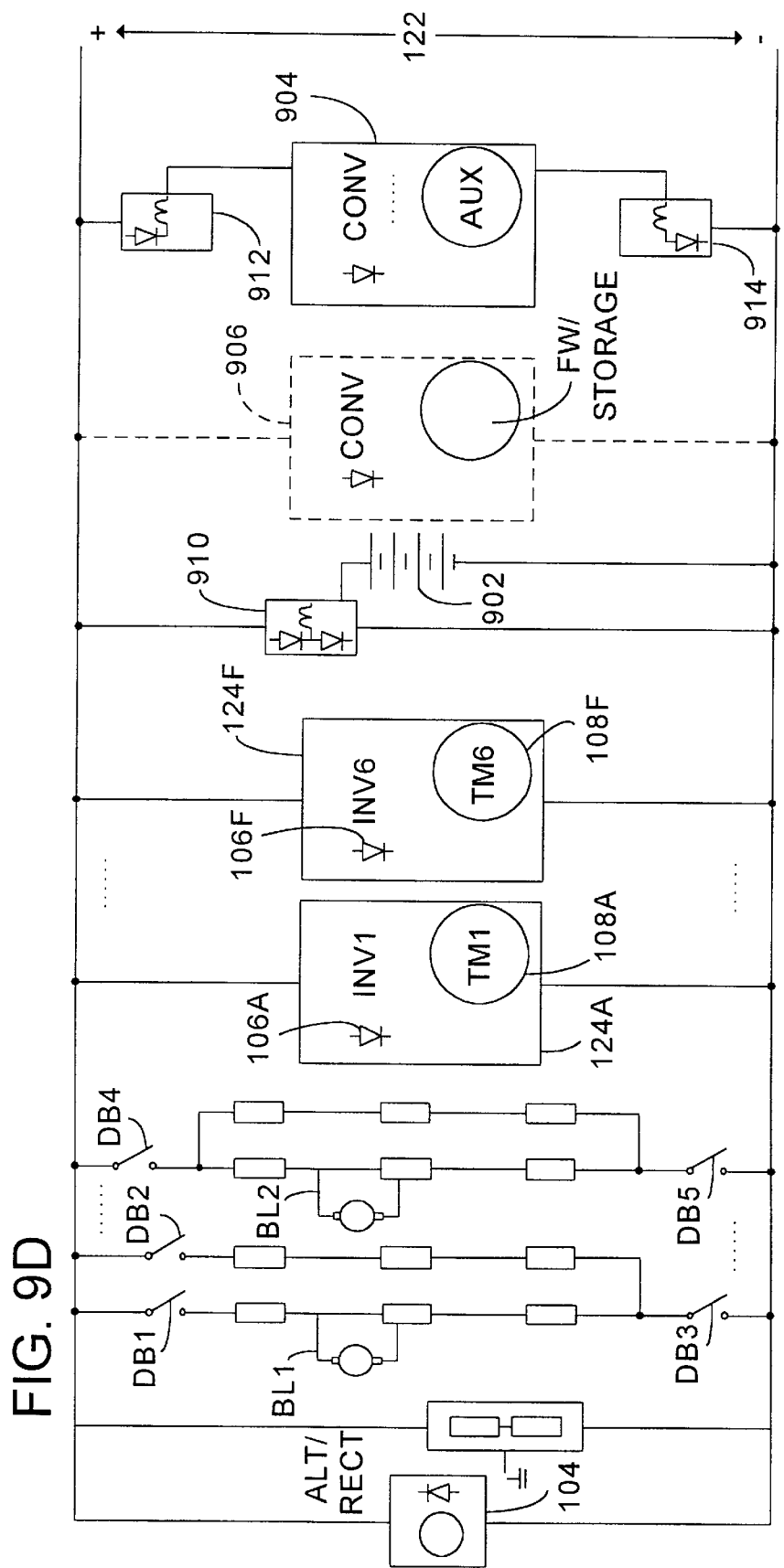

FIG. 9D is an electrical schematic of a locomotive electrical system that is similar to the system shown in FIG. 9C. One difference between these systems is that the auxiliary power subsystem 904 reflected in FIG. 9D is connected to DC bus 122 via a pair of dc-to-dc converters 912 and 914. Such a configuration provides the advantage of allowing the use of existing, lower voltage auxiliary drives and/or motor drives having low insulation. On the other hand, in this configuration, the auxiliary power traverses two power conversion stages. It should be understood that although FIG. 9D illustrates the auxiliaries as consuming power all of the time—not regenerating—bi-directional dc-to-dc converters can also be used in configurations in which it is desirable to have the auxiliaries regenerate power (see, for example, FIG. 9G). These dc-to-dc converters 912 and 914 are preferably controlled via an energy management system that controls the storage and regeneration of energy in the energy storage medium.

Figure 9E:
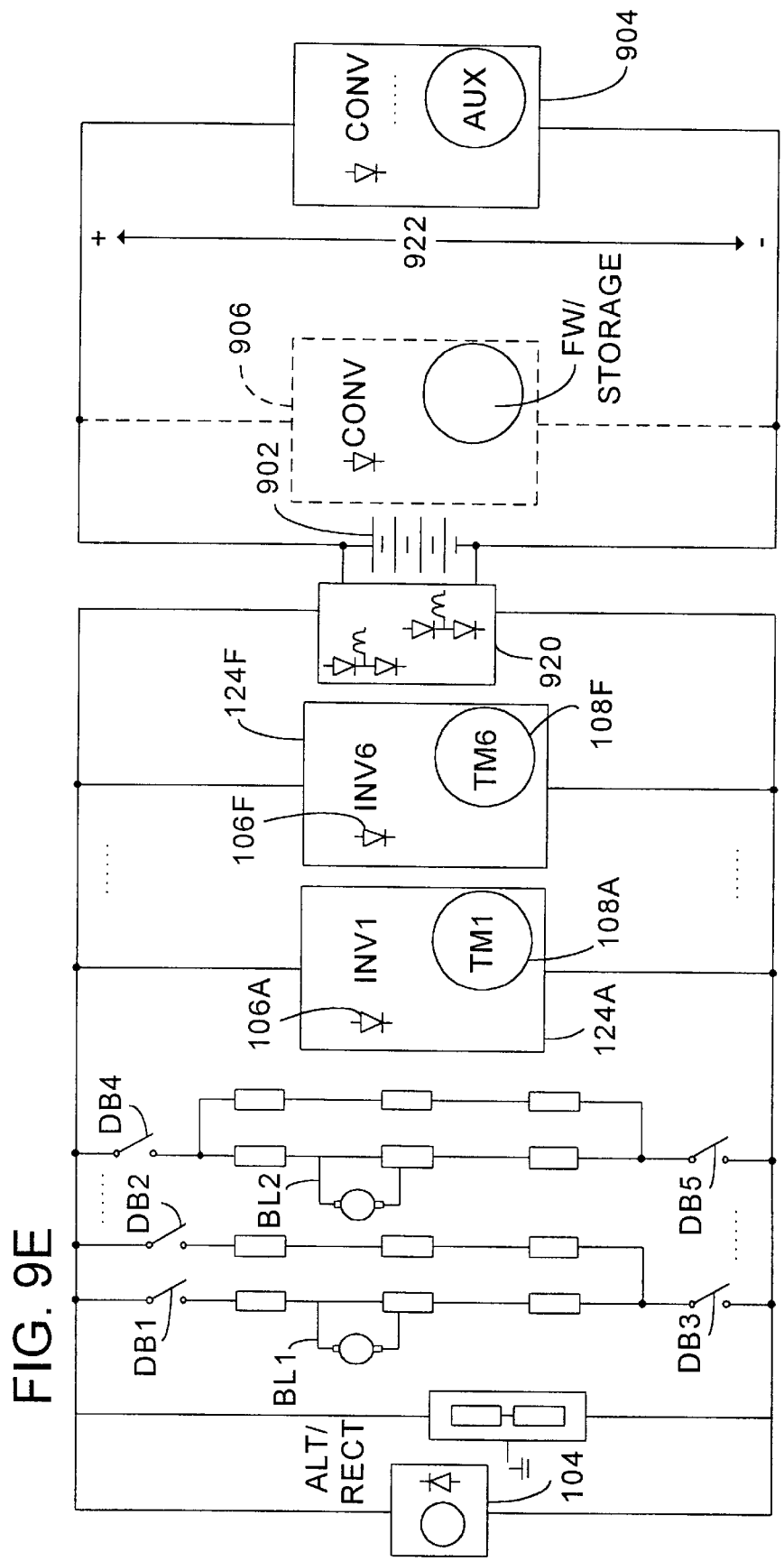
Figure 9F:
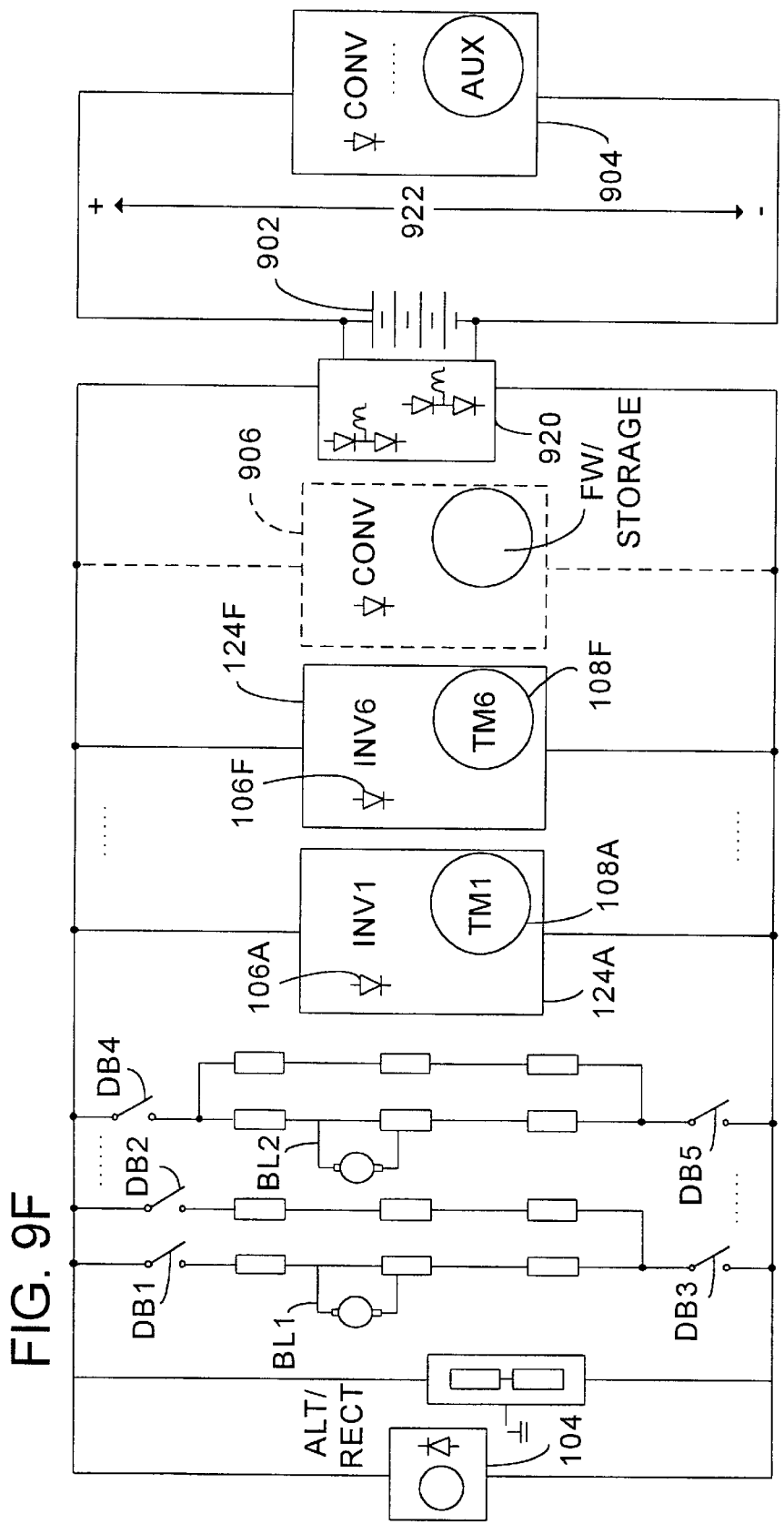

FIG. 9F reflects a variation of the configuration of FIG. 9E. In the configuration of FIG. 9F, any variable voltage storage elements (e.g., capacitors, flywheels, and the like) that are used in addition to battery storage 902 are connected directly across main DC bus 122 (the traction bus). However, battery storage 902 remains connected across the isolated DC battery bus 922. Advantageously, in this configuration dc-to-dc converter 920 matches the voltage level of battery storage 902 but avoids two conversions of large amounts of power for the variable voltage storage elements. Like the other configurations, the configuration of FIG. 9F may be implemented in connection with an energy management system that oversees and controls the storage and regeneration of energy in the energy storage medium.

FIG. 9F reflects a variation of the configuration of FIG. 9E. In the configuration of FIG. 9F, any variable voltage storage elements (e.g., capacitors, flywheels, and the like) that are used in addition to battery 906 are connected directly across main DC bus 122 (the traction bus). However, battery 906 remains connected across the isolated DC battery bus 922. Advantageously, in this configuration dc-to-dc converter 920 matches the voltage level of battery storage 902 but avoids two conversions of large amounts of power for the variable voltage storage elements. Like the other configurations, the configuration of FIG. 9F may be implemented in connection with an energy management system that oversees and controls the storage and regeneration of energy in the energy storage medium.

Figure 9G:
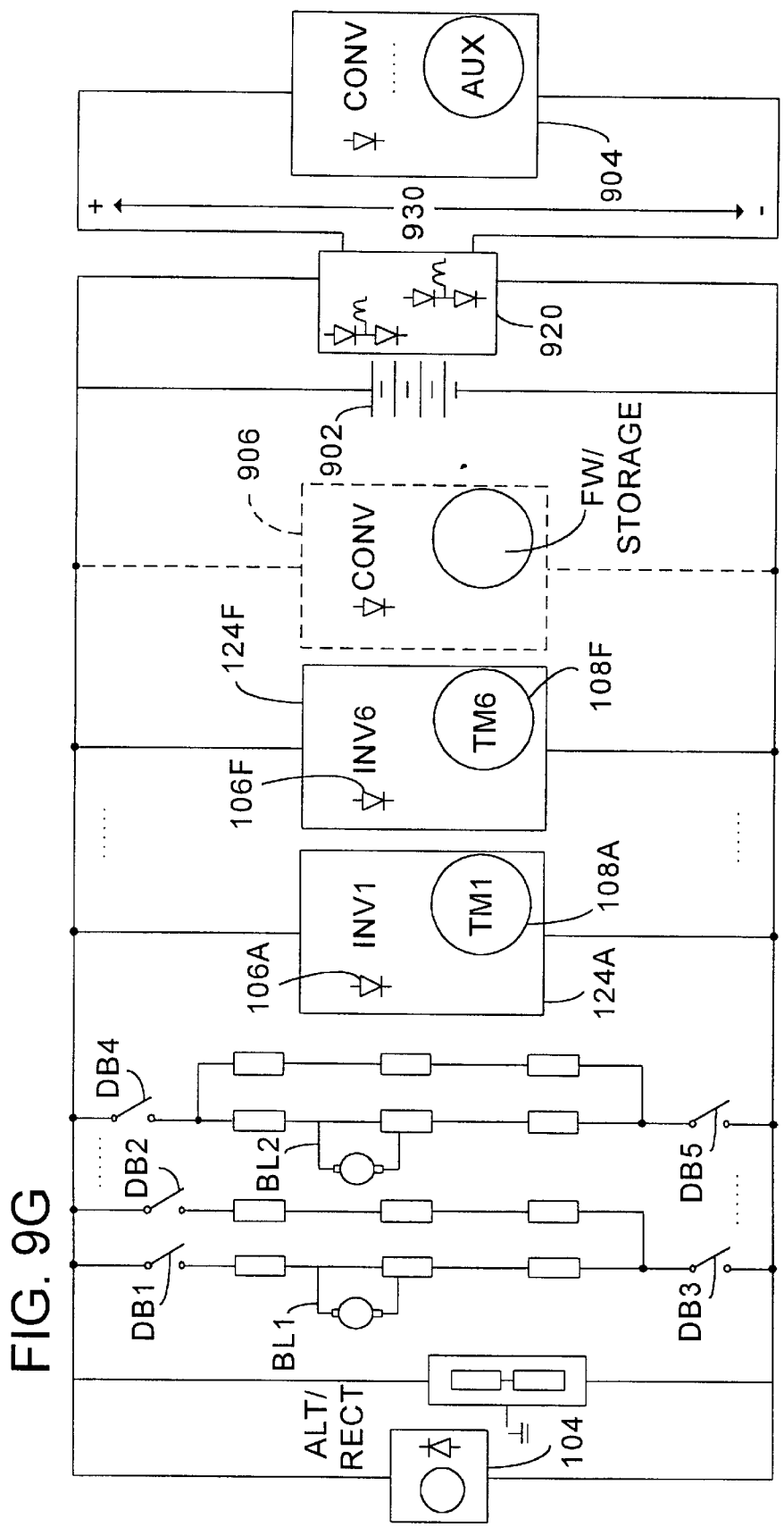

FIG. 9G reflects a variation of the configuration of FIG. 9F in which only the auxiliaries are connected to a separate auxiliary bus 930 through two-stage converter 920. Accordingly, electric power carried on DC bus 122 is provided at a first power level and power carried on the auxiliary bus 930 is provided at a second power level. The first and second power levels may or may not be the same.

Figure 10A:
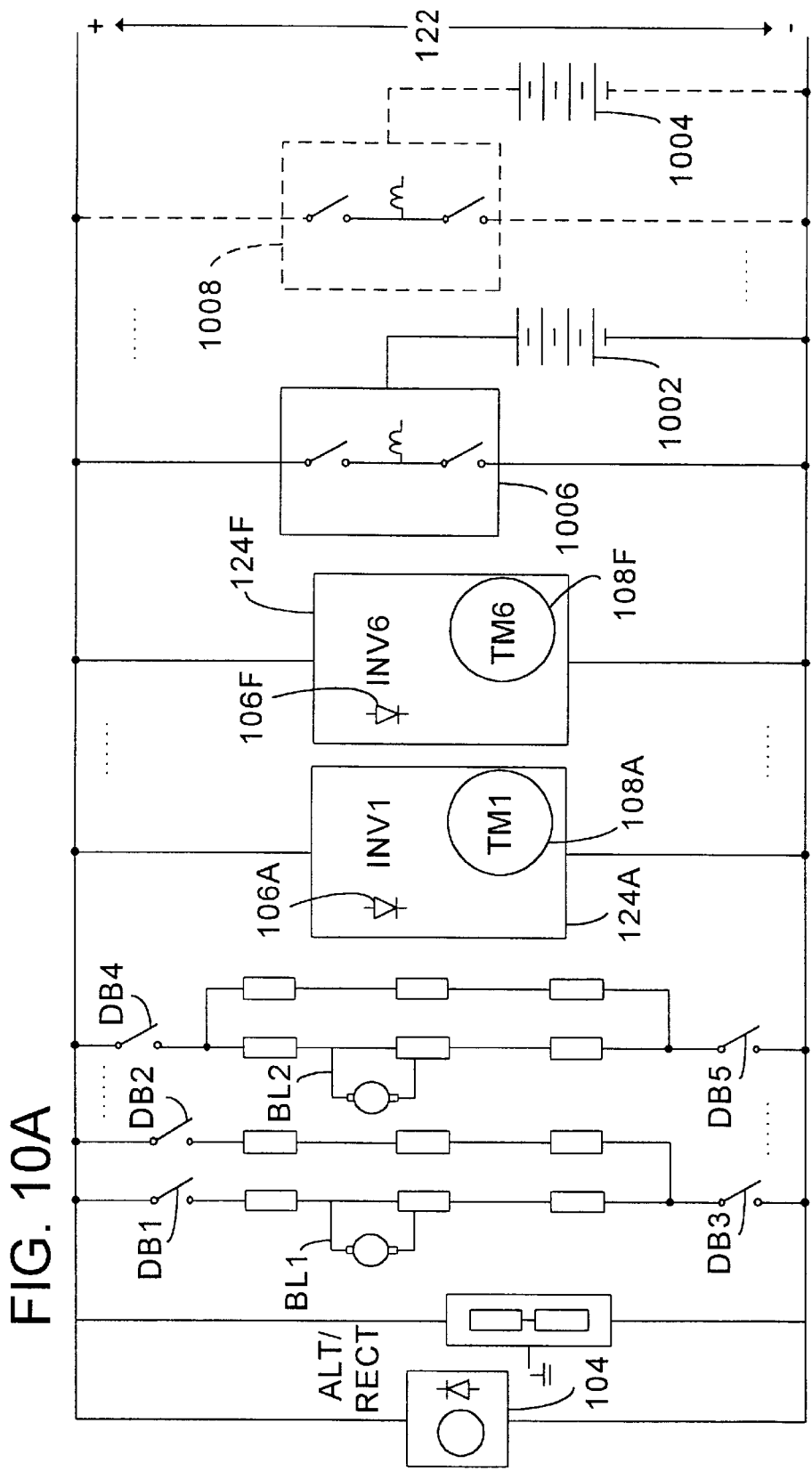
FIGS. 10A–10C are electrical schematics illustrating additional embodiments of an electrical system suitable for use in connection with a hybrid energy off-highway vehicle, such as a diesel-electric locomotive.
Figure 10B:
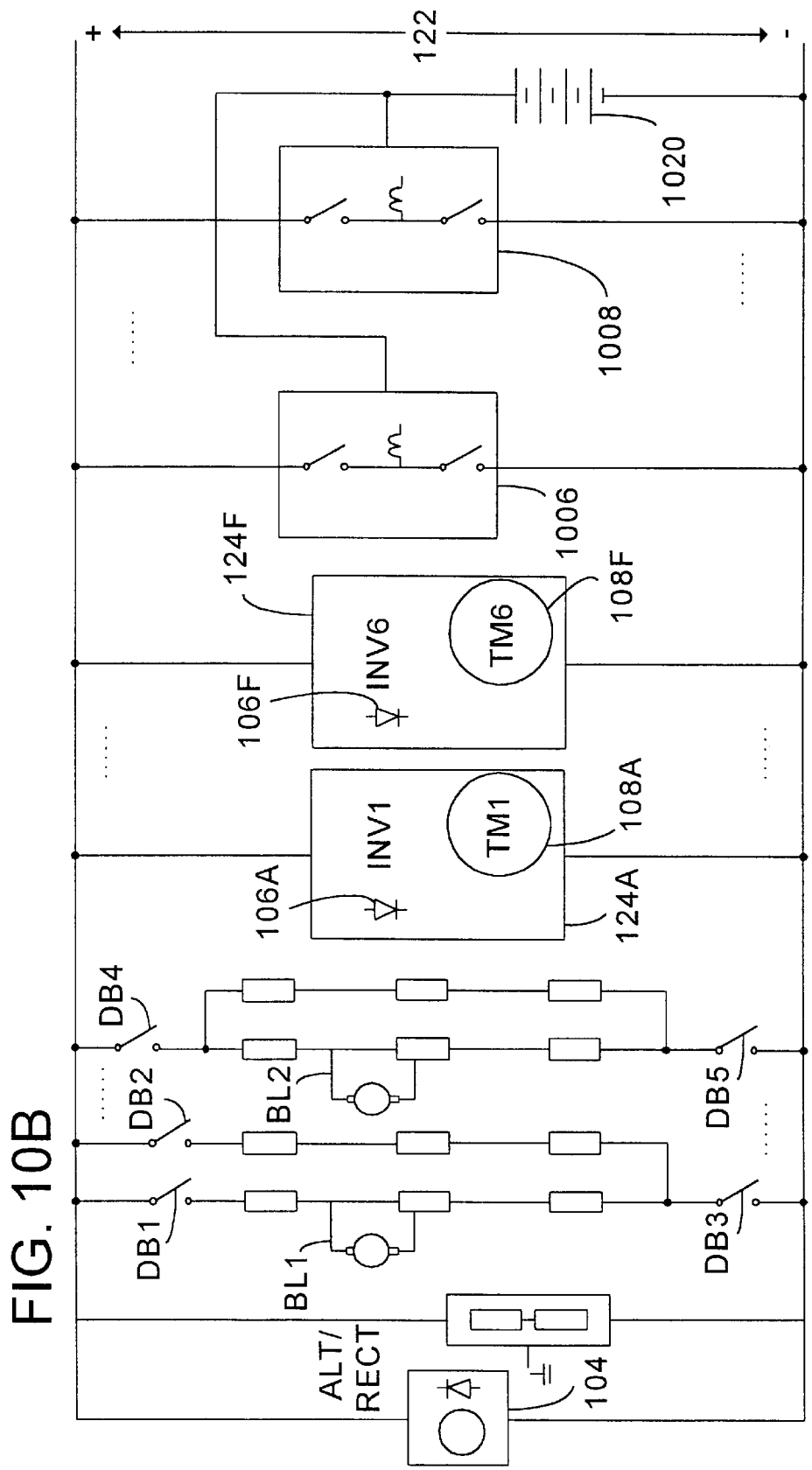
Figure 10C:
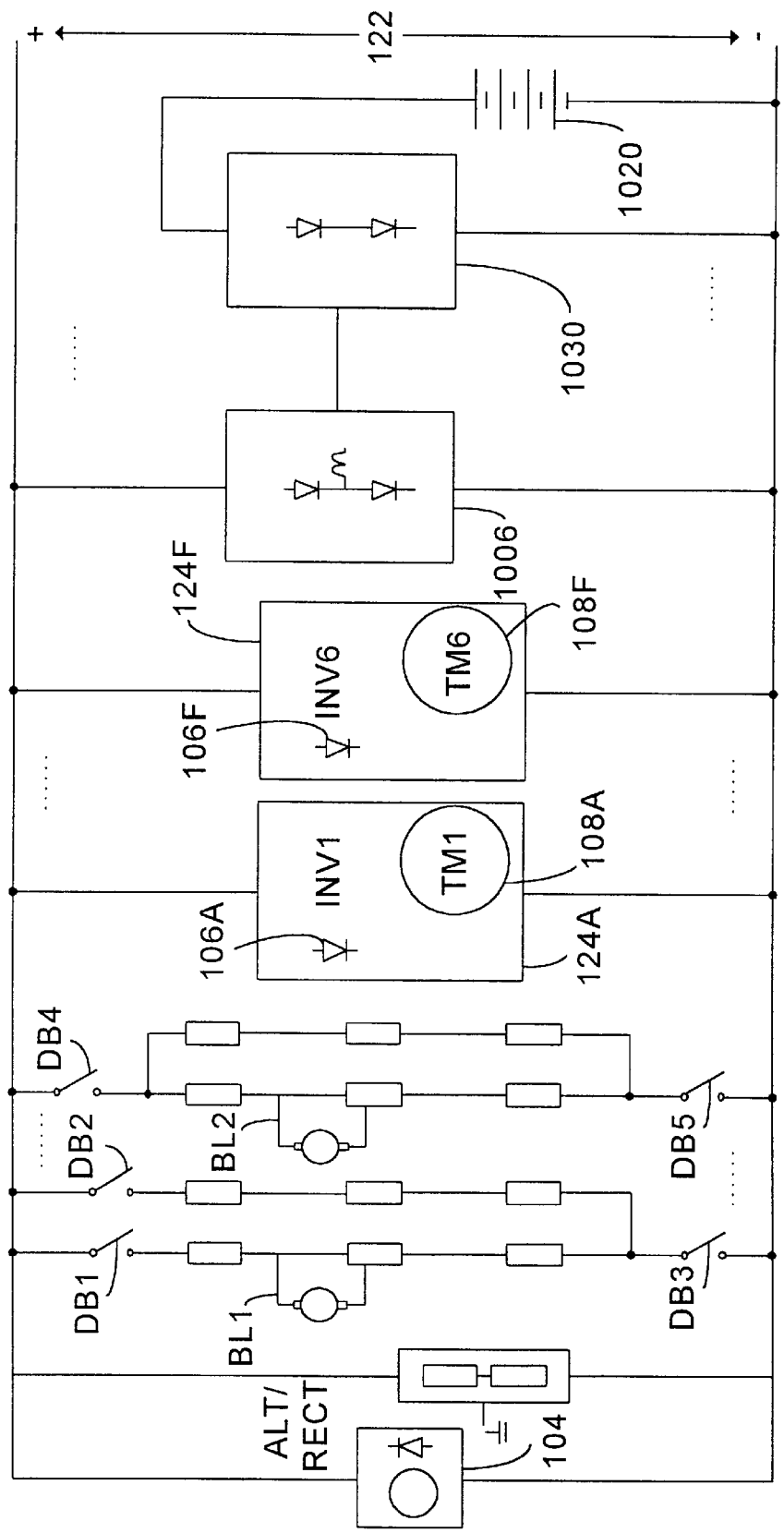

FIGS. 10A–10C are electrical schematics that illustrate additional embodiments, including embodiments particularly suited for modifying existing AC diesel-electric locomotives to operate in accordance with aspects of the present disclosure. It should be understood, however, that the configurations illustrated and described with respect to FIGS. 10A–10C are not limited to retrofitting existing diesel-electric locomotives.

FIG. 10A illustrates a variation of the embodiment illustrated in FIG. 9C. The embodiment of FIG. 10A uses only battery storage devices and does not include a non-battery storage, such as optional flywheel storage 906. In particular, FIG. 10A illustrates an embodiment having a converter 1006 (e.g., a dc-to-dc converter) connected across DC bus 122. A battery storage element 1002 is connected to the converter 1006. Additional converters and battery storage elements may be added to this configuration in parallel. For example, another converter 1008 may be connected across DC bus 122 to charge another battery storage element 1004. One of the advantages of the configuration of FIG. 10A is that it facilitates the use of multiple batteries (or battery banks) having different voltages and/or charging rates.

In certain embodiments, power transfer between energy storage devices is facilitated. The configuration of FIG. 10A, for instance, allows for energy transfer between batteries 1002 and 1004 via the DC bus 122. For example, if, during motoring operations, the engine (prime mover) supplies 2000 h.p. of power to the dc traction bus, the traction motors consume 2000 h.p., and battery 1002 supplies 100 h.p. to the traction bus (via converter 1006), the excess 100 h.p. is effectively transferred from battery 1002 to battery 1004 (less any normal losses).

The configuration illustrated in FIG. 10B is similar to that of FIG. 10A, except that it uses a plurality of converters (e.g., converters 1006, 1008) connected to the DC bus 122 to supply a common battery 1020 (or a common battery bank). One of the advantages of the configuration of FIG. 10B is that it allows the use of relatively smaller converters. This may be particularly advantageous when retrofitting an existing locomotive that already has one converter. A similar advantage of this configuration is that it allows the use of higher capacity batteries. Still another advantage of the configuration of FIG. 10B is that it permits certain phase shifting operations, thereby reducing the ripple current in the battery and allowing the use of smaller inductors (not shown). For example, if converters 1006 and 1008 are operated at 1000 Hz, 50% duty cycles, and the duty cycles are selected such that converter 1006 is on while converter 1008 is off, the converter effect is as if a single converter is operating at 2000 Hz, which allows the use of smaller inductors.

FIG. 10C an electrical schematic illustrating another embodiment that is particularly well-suited for retrofitting an existing diesel-electric locomotive to operate as a hybrid energy locomotive. The configuration of FIG. 10C uses a double set of converters 1006, 1030 and one or more batteries 1020 (of the same or different voltage levels). An advantage of the system depicted in FIG. 10C is that the battery 1020 can be at a higher voltage level than the DC bus 122. For example, if the converters 1006, 1008 illustrated in FIGS. 10A and 10B are typical two quadrant converters, they will also have freewheeling diodes associated therewith (not illustrated). If the voltage of battery 1002, 1004 (FIG. 10A), or 1020 (FIG. 10B) exceeds the DC bus voltage, the battery will discharge through the freewheeling diode. A double converter, such as that illustrated in FIG. 10C, avoids this situation. One advantage of this capability is that the voltage level on the DC bus can be modulated to control power to the dynamic braking grids independently.

Figure 11:
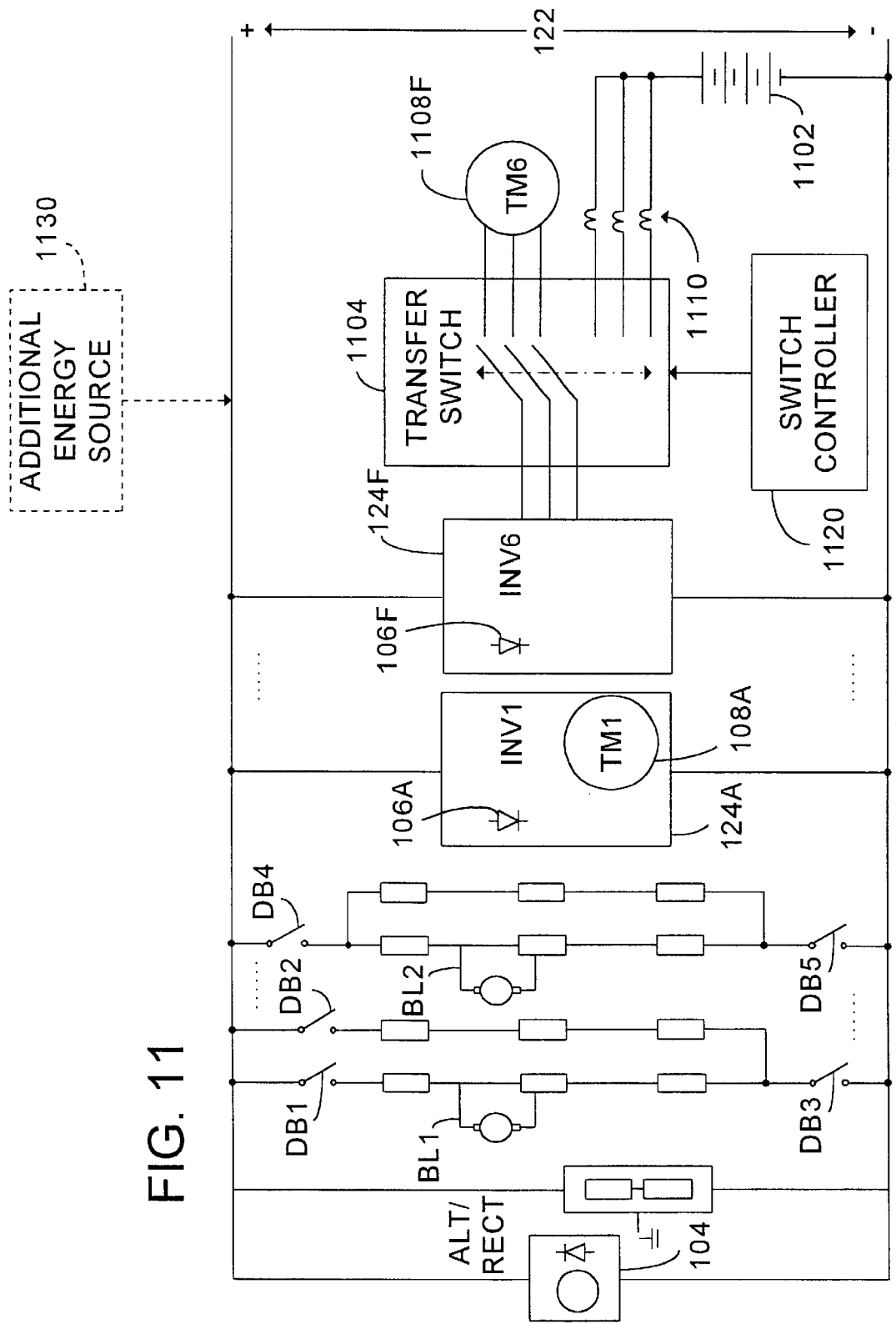
FIG. 11 is an electrical schematic that illustrates one preferred way of connecting electrical storage elements.

FIG. 11 is an electrical schematic that illustrates one preferred way of connecting electrical storage elements. In particular, FIG. 11 illustrates an electrical schematic of a system that may be used for retrofitting a prior art diesel-electric locomotive to operate as a hybrid energy locomotive, or for installing a hybrid energy system as part of the original equipment during the manufacturing process. The embodiment illustrated assumes an AC diesel-electric locomotive with six axles. Each axle is driven by an individual traction motor subsystem. One such AC locomotive is the AC4400, available from the assignee of the present invention.

Typically, the converter/motor system have extra capability (e.g., power capacity) available in the majority of operating conditions. Such extra capability may be due to lower actual ambient conditions, as compared with the design criteria. For example, some locomotives are designed to operate in ambient temperatures of up to 60 degrees Celsius, which is well above typical operating conditions. Considerations other than thermal conditions may also result in extra capacity during significant operating periods. In a typical diesel-electric locomotive, for instance, the use of all of the traction motors may only be required for low speed and when the locomotive operates in an adhesion limited situation (poor rail conditions). In such case, the weight on the driven axles determines the pulling power/tractive effort. Hence, all axles/motors need to be driven to obtain maximum tractive effort. This can be especially true if the train is heavily loaded during poor rail conditions (snowy or slippery). Such conditions are normally present for only a fraction of the locomotive operating time. During the majority of the operating time, all of the traction motors/inverters are not fully utilized to supply tractive effort. Thus, for example, when retrofitting an existing prior art locomotive, or manufacturing a new locomotive, it is possible to take advantage of this partial underutilization of the traction motors/inverters.

By way of a specific example, the embodiment of FIG. 11 is configured such that one of the six traction motor subsystems is connected to the energy storage element 1102, through a transfer switch 1104 and a plurality of windings 1110. More particularly, the traction motor subsystem 1 124F includes an inverter 106F and a traction motor 1108F. Such a configuration is suited for retrofitting a single axle of an existing prior art diesel-electric locomotive. It should be understood that retrofitting a typical prior art diesel-electric locomotive requires the addition of power conversion equipment and associated cooling devices. The space available for installing the retrofit equipment, however, is generally limited. Therefore, one of the advantages of the "single-axle" configuration of FIG. 11 is that it tends to minimize impacts and makes retrofitting a more viable option. Similar advantages, however, may also be enjoyed when the hybrid energy system is installed as original equipment during manufacturing.

The transfer switch 1104 preferably comprises a three-phase set of contactors or a set of motorized contacts (e.g., bus bars) which connect inverter 106F to traction motor 1108F when all of the axles are needed, and connects inverter 1106F to inductors 1110 and battery 1102 when battery charging or discharging is desired. Thus, transfer switch 1104 has a first connection state and a second connection state. In the first connection state, transfer switch 1104 connects inverter 1 06F to traction motor 11 08F. In the second connection state, transfer switch connects inverter 106F to battery 1102.

Transfer switch 1104 is preferably controlled by a switch controller 1120. In one form, the switch controller 1120 is a manual operator-controlled switch that places transfer switch 1104 into the first or the second connection state. In another form, the switch controller reflects control logic that controls the connection state of transfer switch 1104 in accordance with a preferred operating scheme. Table I (below) is indicative of one such preferred operating scheme. Other schemes are possible.

Although FIG. 11 illustrates a three phase connection between battery 1102 and transfer switch 1104, it is not necessary that all three phases be used. For example, if the power requirement is relatively low, only one or two phases may be used. Similarly, three separate batteries could be independently connected (one to each phase), or one large battery could be connected to two phases, with a relatively smaller battery connected to the third phase. Further, power transfer between multiple batteries having different voltage potentials and/or capacities is also possible.

The configuration of FIG. 11 is especially advantageous in the context of retrofitting existing locomotives because transfer switch 1104 is believed to be much less expensive than adding additional inverters and/or dc-to-dc converters. Such advantage, however, is not limited to the retrofit context. Also, it should be understood that the configuration of FIG. 11 is not limited to a single inverter per transfer switch configuration.

FIG. 11 further illustrates an optional charging source 1130 that may be electrically connected to DC traction bus 122. The charging source 1130 may be, for example, another charging engine (see FIG. 3) or an external charger, such as that discussed in connection with FIG. 5.

The general operation of the configuration of FIG. 11 will be described by reference to the connection states of transfer switch 1104. When transfer switch 1104 is in the first switch state, the sixth axle is selectively used to provide additional motoring or braking power. In this switch state, battery 1102 is effectively disconnected and, therefore, neither charges nor discharges.

When the sixth axle is not needed, switch controller 1120 preferably places transfer switch 1104 in the second connection state—battery 1102 is connected to inverter 106F. If, at this time, the other traction motors (e.g., traction motor 108A) are operating in a dynamic braking mode, electrical energy is generated and carried on DC traction bus 122, as described in greater elsewhere herein. Inverter 106F transfers a portion of this dynamic braking electrical energy to battery 1102 for storage. If, on the other hand, the other traction motors are operating in a motoring mode, inverter 106F preferably transfers any electrical energy stored in battery 1102 onto DC traction bus 122 to supplement the primary electric power supplied by prime mover power source 104. Such electrical energy transferred from battery 1102 to DC traction bus 122 may be referred to as secondary electric power. In one preferred embodiment, inverter 106F comprises a chopper circuit (not shown) for controlling the provision of secondary electric power to DC traction bus 122 from battery 1102.

It should be understood, however, that battery 1102 can also be charged when the other traction motors are not operating in a dynamic braking mode. For example, the battery can be charged when transfer switch 1104 is in the second connection state (battery 1102 is connected to inverter 106F) and the other traction motors are motoring or idling if the amount of power drawn by the other traction motors is less than the amount of primary electric power carried on DC traction bus 122.

Advantageously, battery 1102 can also be charged using charging electric power from optional energy source 1130. As illustrated in FIG. 11, optional energy source 1130 is preferably connected such that it provides charging electric power to be carried on DC traction bus 122. When optional energy source 1130 is connected and providing charging electric power, switch controller 1120 preferably places transfer switch 1104 in the second connection state. In this configuration, inverter 106F transfers a portion of the electric power carried on DC traction bus 122 to battery 1102 for storage. As such, battery 1102 may be charged from optional energy source 1130.

In summary, in the embodiment of FIG. 11, when transfer switch is in the second connection state, battery 1102 may be charged from dynamic braking energy, from excess locomotive energy (i.e., when the other traction motors draw less power than the amount of primary electric power carried on DC traction bus 122), and/or from charging electric power from optional charging source 1130. When transfer switch 1104 is in the second connection state and the other traction motors draw more power than the amount of primary electric power carried on DC traction bus 122, inverter 1106 transfers secondary electric power from battery 1102 to DC traction bus 122 to supplement the primary electric power. When transfer switch 1104 is in the first connection state, battery 1102 is disconnected and traction motor 1108F is operable to assist in motoring and/or dynamic braking. Table I summarizes one set of operating modes of the embodiment of FIG. 11.

TABLE I

| Five Axles | Six Axles |
|---|---|
| Low Speed and Low Tractive Effort Settings | Battery Fully Charged & Dynamic Braking |
| High Speed Motoring | No Battery Charging & Motoring Battery Discharged & Motoring Very High Speed Dynamic Braking |

While FIG. 11 illustrates an energy storage device in the form of a battery, other energy storage devices, such as flywheel systems or ultra-capacitors, may also be employed instead of or in addition to battery 1102. Further, it should be understood that the configuration of FIG. 11 may be scaled. In other words, the configuration can be applied to more than one axle.

FIG. 12 is a flow chart that illustrates one method of operating a hybrid energy locomotive system. The particular method illustrated relates to a system including a locomotive vehicle and an energy tender vehicle. The locomotive includes a diesel-electric prime mover power source that supplies primary electric power to a plurality of traction motor systems associated with the locomotive. As explained elsewhere herein, the traction motor systems operate the locomotive in a motoring mode in response to the primary electric power. In this particular example, the energy tender also includes a plurality of traction motor systems (see FIG. 2). The energy tender traction motor systems are operable in both a motoring mode and a dynamic braking mode. The energy tender vehicle also includes an energy storage system for capturing at least a portion of the electrical energy generated when the energy tender traction motors operate in the dynamic braking mode.

At blocks 1202 and 1204, primary electric power is supplied to one or more of the locomotive traction motor systems, thereby causing the locomotive to operate in a motoring mode. When the locomotive traction motor systems operate in the motoring mode, it is possible to operate one or more of the energy tender traction motor systems in a dynamic braking mode, as shown by block 1206. Of course, the energy tender traction motor systems can be operated in the dynamic braking mode at other times such as, for example, when the locomotive traction motor systems operate in the dynamic braking mode. As shown at blocks 1208 and 1210, when one or more of the energy tender traction motor systems operate in the dynamic braking mode, electrical energy is generated. Some of the dynamic braking energy is preferably stored in the energy storage system for later use. For example, such stored power may be converted and supplied as secondary electric power for use by the energy tender traction motor systems to assist in motoring, as shown by block 1212.

Advantageously, the method of FIG. 12 permits locating the energy tender vehicle anywhere in the train because the energy tender vehicle can capture dynamic braking energy from its own traction motor systems. In other words, the energy capture system need not be electrically connected to the locomotive in order to store energy for later use.

Although the foregoing descriptions have often referred to AC diesel-electric locomotive systems to describe several pertinent aspects of the disclosure, the present invention should not be interpreted as being limited to such locomotive systems. For example, aspects of the present disclosure may be employed with "all electric" locomotives powered by electric "third rails" or overhead power systems. Further, aspects of the hybrid energy locomotive systems and methods described herein can be used with diesel-electric locomotives using a DC generator rather than an AC alternator and combinations thereof. Also, the hybrid energy locomotive systems and methods described herein are not limited to use with AC traction motors. As explained elsewhere herein, the energy management system disclosed herein may be used in connection with non-locomotive off-highway vehicles such as, for example, large excavators.

As can now be appreciated, the hybrid energy systems and methods herein described provide substantial advantages over the prior art. Such advantages include improved fuel efficiency, increased fuel range, and reduced emissions such as transient smoke. Other advantages include improved speed by the provision of an on-demand source of power for a horsepower burst. Such a system also provides improved tunnel performance such as, for example, improved immunity to oxygen and/or temperature derations in tunnels. Also among the advantages are reduced noise and vibration conditions, which may be particularly beneficial to personnel who work on the train. Significantly, the hybrid energy locomotive system herein described may also be adapted for use with existing locomotive systems.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several objects of the invention are achieved and other advantageous results attained.

As various changes could be made in the above exemplary constructions and methods without departing from the scope of the invention, it is intended that all matter contained in the above description or shown in the accompanying drawings shall be interpreted as illustrative and not in a limiting sense. It is further to be understood that the steps described herein are not to be construed as necessarily requiring their performance in the particular order discussed or illustrated. It is also to be understood that additional or alternative steps may be employed with the present invention.

What is claimed is:

1. A hybrid energy locomotive system far use in connection with a railroad train, the system comprising:
    a locomotive having a plurality of locomotive wheels;
    a locomotive traction motor associated with one of the plurality of locomotive wheels, said locomotive traction motor having a first rotatable shaft mechanically coupled to the one of the plurality of locomotive wheels;
    an engine carried on the locomotive;
    an energy management processor;
    an electric power generator carried on the locomotive, said generator responsive to said processor and connected to and driven by the engine for generating and selectively supplying primary locomotive electric power to the locomotive traction motor, said locomotive traction motor being operable in response to the primary locomotive electric power to rotate the first rotatable shalt and to drive the one of the plurality of locomotive wheels, said locomotive traction motor further having a dynamic braking mode of operation wherein the locomotive traction motor generates electrical energy in the form of electricity; and
    an electrical energy capture system carried on the train, said capture system responsive to said processor and in electrical communication with the locomotive fraction motor for selectively storing electrical energy generated in the dynamic braking mode and selectively providing secondary electric power from said stored electrical energy to the traction motor to selectively supplement the primary locomotive electric power with the secondary electric power so that said locomotive traction motor is operable in response to the primary locomotive power and the secondary electric power;
    wherein the processor provides a first control signal to the capture system to control the selective storing of electrical energy generated in the dynamic braking mode and to control the selective providing of secondary electric power to the locomotive traction motor to supplement the primary electric power, and provides a second control signal to the generator for controlling the selective supplying of primary locomotive electric power to the locomotive traction motor.

2. The hybrid energy locomotive system of claim 1 wherein the electrical energy capture system is in electrical communication with the electric power generator and selectively stores the primary locomotive electric power, and wherein the energy management processor provides the first control signal to the capture system to control the selective storing or primary locomotive electric power by the energy capture system.

3. The hybrid energy locomotive system of claim 1 further comprising a charger external to the train supplying charging electric power and wherein the electrical energy capture system is selectively connected to said charger such that the electrical energy capture system stores the charging electric power when connected to the charger.

4. The hybrid energy locomotive system of claim 1 farther comprising;
    a charging engine carried on the train having a power converter supplying charging electric power; and
    wherein the electrical energy capture system is selectively electrically connected to the power converter of the charging engine such that the electrical energy capture system stores the charging electric power.

5. The hybrid energy locomotive system of claim 1 wherein the electrical energy capture system comprises:
    an energy storage system for storing the electrical energy generated in the dynamic braking mode; and
    an electrical power conversion system for retrieving from the energy storage system the stored electrical energy and for providing the secondary electric power.

6. The hybrid energy locomotive system of claim 5 wherein the energy storage system comprising a battery system.

7. The hybrid energy locomotive system of claim 5 wherein the energy storage system comprises a flywheel system.

8. The hybrid energy locomotive system of claim 5 wherein the energy storage system comprises an ultracapacitor.

9. The hybrid energy locomotive system of claim 1 further comprising:
    a resistive braking grid; and
    a control circuit electrically connected to the resistive braking grid, the electrical energy capture system operating said control circuit such that the control circuit selectively allows the electrical energy generated in the dynamic braking mode to be dissipated by the resistive braking grid.

10. The hybrid energy locomotive system of claim 9 wherein the control circuit comprises a chopper circuit and wherein the electrical energy capture system operates the chopper circuit at a duty cycle to selectively allow the electrical energy generated in the dynamic braking mode to be dissipated by the resistive braking grid.

11. The hybrid energy locomotive system of claim 1 wherein the electric power generator comprises a DC traction bus, said DC traction bus carrying the electrical energy generated in the dynamic braking mode and carrying the secondary electric power, said electrical energy generated in the dynamic braking mode comprising DC electric power at a first voltage level.

12. The hybrid energy locomotive system of claim 11 wherein the electrical energy capture system comprises a first dc-to-dc converter electrically connected to the DC traction bus, said first dc-to-dc converter converting the DC electric power carried on the DC traction bus from the first voltage level to a second voltage level.

13. The hybrid energy locomotive system of claim 12 wherein the electrical energy capture system further comprises a first electrical energy storage device connected to the first dc-to-dc converter, said first electrical energy storage device receiving the DC electric power at the second voltage level from the first dc-to-dc converter.

14. The hybrid energy locomotive system of claim 13 wherein the electrical energy capture system further comprises:
a second dc-to-dc converter electrically connected to the DC traction bus, said second dc-to-dc converter converting the DC electric power carried on the DC traction bus from the first voltage level to a third voltage level; and
a second electrical energy storage device connected to the second dc-to-dc converter, said second electrical energy storage device receiving the DC electric power at the third voltage level from the second dc-to-dc converter.

15. The hybrid energy locomotive system of claim 14 wherein the first and second energy storage devices comprise batteries and wherein the first voltage level and the second voltage level are substantially the same.

16. The hybrid energy locomotive system of claim 13 wherein the electrical energy capture system further comprises a flywheel system electrically connected to the DC traction bus and wherein the first electrical energy storage device comprises a battery system.

17. The hybrid energy locomotive system of claim 13 further comprising a battery bus and wherein the first dc-to-dc converter comprises a bi-directional converter converting the DC electric power carried on the DC traction bus from the first voltage level to the second voltage level and wherein the converted DC electric power at the second voltage level is carried on the battery bus.

18. The hybrid energy locomotive system of claim 17 wherein the first electrical energy storage device comprises a battery system electrically connected to the battery bus.

19. The hybrid energy locomotive system of claim 18 wherein the electrical energy capture system further comprises a flywheel system.

20. The hybrid energy locomotive system of claim 19 wherein the flywheel system is connected in parallel with the battery system.

21. The hybrid energy locomotive system of claim 12 further comprising:
an auxiliary power bus supplying auxiliary electrical power to an auxiliary electrical system associated with the locomotive;
wherein the first dc-to-dc converter comprises a bi-directional converter converting the DC electric power carried on the DC traction bus From the first voltage level to the second voltage level and wherein the converted DC electric power at the second voltage level is carried on the auxiliary power bus; and
wherein the electrical energy capture system further comprises a first electrical energy storage device, said first electrical energy storage device and said first dc-to-dc convener being connected in parallel across the DC traction bus.

22. The hybrid energy locomotive system of claim 32 wherein the first electrical energy storage device comprises a battery system and the second electrical energy storage device comprises a flywheel system.

23. The hybrid energy locomotive system of claim 1 wherein the electrical energy capture system comprises:
a power converter electrically connected to the DC traction bus;
a first storage device selectively storing a first portion of the electrical energy generated in the dynamic braking mode;
a second storage device selectively storing a second portion of the electrical energy generated in the dynamic braking mode; and
wherein the power converter transfers part of the first portion of the electrical energy generated in the dynamic braking mode stored in the first storage device to the second storage device.

24. The hybrid energy locomotive system of claim 23 wherein the first storage device comprises a flywheel system and the second storage device comprises a battery system.

25. The hybrid energy locomotive system of claim 23 wherein the first and second storage devices comprise battery systems.

26. A hybrid energy locomotive system for use in connection with a railroad train for propelling a consist on a track, said system comprising:
an engine carried on the train;
an energy management processor;
a power converter driven by the engine for selectively providing primary electric power and responsive to said processor;
a traction bus coupled to the power converter and carrying the primary electric power;
a locomotive traction system coupled to the traction bus, said locomotive traction system having a motoring mode and a dynamic braking mode, said locomotive traction system propelling the consist in response to the primary electric power in the motoring mode and said locomotive traction system generating electrical energy in the dynamic braking mode; and
an electrical energy storage system carried on the train, responsive to said processor, said electrical energy storage system coupled to the traction bus selectively capturing electrical energy generated by the locomotive traction system in the dynamic braking mode and selectively transferring the captured electrical energy as secondary electric power to the locomotive traction system to augment the primary electric power in the motoring mode, and said locomotive traction system propelling the consist in response to the secondary electric power; and
wherein the processor provides a first control signal to the electrical energy storage system to control the selective storing of electrical energy generated in the dynamic braking mode and to control the selective providing of secondary electric power to the locomotive traction motor to supplement the primary electric power, and provides a second control signal to the power converter for controlling the selective supplying of primary locomotive electric power to the locomotive traction motor.

27. The hybrid energy locomotive system of claim 26 wherein the locomotive traction system comprises a locomotive inverter and a locomotive traction motor, said locomotive inverter being electrically coupled to the traction bus and responsive to the primary electric power to provide drive power, said locomotive traction motor being electrically coupled to the locomotive inverter and propelling the consist in response to the drive power.

28. An electrical energy capture system for use in connection with a hybrid energy locomotive system of a railroad train, the hybrid energy locomotive system includes a locomotive, an engine, and a locomotive traction motor propelling the locomotive in response to the primary electric power, said locomotive traction motor having a dynamic braking mode of operation generating electrical energy, the electrical energy capture system comprising:

an energy management processor carried on the train;

a locomotive electric power generator connected to and driven by the engine for selectively supplying primary electric power, said locomotive electric power generator being responsive to said processor; and an electrical energy storage device curried on a train in electrical communication with the locomotive traction motor and responsive to said processor, said electrical energy storage device selectively storing electrical energy generated in the dynamic braking mode, and said electrical energy storage device selectively providing secondary electric power from said stored electricity electrical energy to the locomotive traction motor, said locomotive traction motor being responsive to the secondary electric power;

wherein the processor provides a first control signal to the electrical energy storage device to control the selective storing of the electrical energy generated in the dynamic braking mode and to control the selective providing of secondary electric power to the locomotive traction motor, and provides a second control signal to the generator for controlling the selective supplying of primary electric power.

29. The energy capture system of claim 28 further comprising;

a charging engine carried on the train;

a charging engine power converter driven by the charging engine, said charging engine power converter providing charging electric power; and the charging engine power converter being constructed and arranged to be electrically coupled to the electrical energy storage device wherein the electrical energy storage device selectively stores the charging electric power.

30. The energy capture system of claim 28 wherein the electrical energy storage device selectively receives the primary electric power and selectively stores the received primary electric power therein, and wherein the energy management processor provides the first control signal to the electrical energy storage device to control the selective storing of primary locomotive electric power.

31. The energy capture system of claim 28 further comprising:

a charger external to the locomotive system, said charger being constructed and arranged to be selectively electrically coupled to the energy storage device and to provide charging electric power thereto and wherein the energy storage device selectively stores the charging electric power when coupled to the charger.

32. The hybrid energy locomotive system of claim 21 further comprising a second electrical energy storage device, said first and second electrical energy storage devices being connected in parallel across the DC traction bus.

* * * * *

UNITED STATES PATENT AND TRADEMARK OFFICE
CERTIFICATE OF CORRECTION

PATENT NO.      : 6,591,758 B2
DATED           : July 15, 2003
INVENTOR(S)     : Ajith Kuttannair Kumar It is certified that error appears in the above-identified patent and that said Letters Patent is hereby corrected as shown below:

Column 26,
Line 1, "fraction" should read -- traction --
Line 33, "farther" should read -- further --

Column 29,
Line 27, "curried" should read -- carried --

Signed and Sealed this

Fourth Day of November, 2003

JAMES E. ROGAN
*Director of the United States Patent and Trademark Office*